(12) United States Patent
Canfield et al.

(10) Patent No.: US 8,166,996 B2
(45) Date of Patent: May 1, 2012

(54) TOILET BOWL OVERFLOW PREVENTION AND WATER CONSERVATION SYSTEM AND METHOD

(75) Inventors: Eric L. Canfield, Chester Springs, PA (US); Scott Soma, Media, PA (US); James Canfield, Coatsville, PA (US)

(73) Assignee: nth Solutions, LLC, Exton, PA (US)

( * ) Notice: Subject to any disclaimer, the term of this patent is extended or adjusted under 35 U.S.C. 154(b) by 0 days.

(21) Appl. No.: 12/796,437

(22) Filed: Jun. 8, 2010

(65) Prior Publication Data

US 2010/0242160 A1 Sep. 30, 2010

Related U.S. Application Data

(62) Division of application No. 12/036,629, filed on Feb. 25, 2008, now Pat. No. 7,757,708.

(51) Int. Cl.
*F16K 21/18* (2006.01)
(52) U.S. Cl. .................... 137/389; 137/400; 137/460
(58) Field of Classification Search ............ 137/389, 137/400, 460, 456; 4/415, 427
See application file for complete search history.

(56) References Cited

U.S. PATENT DOCUMENTS

| | | | |
|---|---|---|---|
| 265,709 | A | 10/1882 | Sniffen |
| 1,984,394 | A | 12/1934 | Candee |
| 2,375,084 | A | 5/1945 | Coroniti et al. |
| 2,837,111 | A | 6/1958 | Mueller |
| 2,841,169 | A | 7/1958 | Martin et al. |
| 3,095,577 | A | 7/1963 | Clark |
| 3,348,242 | A | 10/1967 | Wilhelm |

(Continued)

FOREIGN PATENT DOCUMENTS

GB 488402 7/1938

(Continued)

OTHER PUBLICATIONS

Evans, Jim, "Toilet Bowl Refill Port & Tube," "How a Toilet Works," http://www.factsfacts.com/MyHomeRepair/toilet_refill.htm, http://www.factsfacts.com/MyHomeRepair/ToiletFlush.htm (Jan. 2005)).

(Continued)

*Primary Examiner* — Craig Schneider
(74) *Attorney, Agent, or Firm* — Nixon & Vanderhye P.C.

(57) ABSTRACT

A system and method for conditionally interfering with the operation of a conventional toilet tank fill valve prevents toilet overflow and conserves water. A single self-contained apparatus, located completely within the toilet tank, detects and prevents a toilet overflow and/or conserves water by conditionally interfering with or overriding the normal operation of a toilet tank fill valve to prevent a further flush. Exemplary illustrative non-limiting steps include removing the toilet tank lid to provide access to said toilet tank fill valve within the tank, manually snapping an assembly onto said fill valve protective cap, and automatically and conditionally actuating said assembly to cause the assembly to selectively interfere with or override the operation of said toilet tank fill valve. An exemplary illustrative non-limiting device comprises an attaching structure for manual attachment to said fill valve cap, and a control mechanism supported by said attaching structure. The control mechanism acts to conditionally interfere with the operation of the toilet tank fill valve assembly in response to abnormal detected toilet tank water level over time, thereby preventing a further flush. The overflow and water conservation feature can be designed into a fill valve at time of manufacture and/or added in the field by an end user.

4 Claims, 30 Drawing Sheets

U.S. PATENT DOCUMENTS

| | | |
|---|---|---|
| 3,363,643 A | 1/1968 | Skulski |
| 3,401,717 A | 9/1968 | Lamb |
| 3,419,912 A | 1/1969 | Kertell |
| 3,619,821 A | 11/1971 | Bobo |
| 3,930,556 A | 1/1976 | Kusuda et al. |
| 3,933,042 A | 1/1976 | Rector et al. |
| 4,110,849 A | 9/1978 | La Faver |
| 4,203,173 A | 5/1980 | Morris et al. |
| 4,216,555 A | 8/1980 | Detjen |
| 4,289,019 A | 9/1981 | Claytor |
| 4,296,505 A | 10/1981 | Chien-Sheng |
| 4,351,071 A | 9/1982 | Clar |
| 4,391,003 A | 7/1983 | Talerico et al. |
| 4,402,093 A | 9/1983 | Luker et al. |
| 4,407,026 A | 10/1983 | Myers |
| 4,455,863 A | 6/1984 | Huebler et al. |
| 4,485,501 A | 12/1984 | Kloner |
| 4,498,203 A | 2/1985 | Barnum et al. |
| 4,538,307 A | 9/1985 | Barnum et al. |
| 4,543,817 A | 10/1985 | Sugiyama |
| 4,547,768 A | 10/1985 | Kulhavy |
| 4,654,646 A | 3/1987 | Charboneau |
| 4,656,464 A | 4/1987 | Cliffgard |
| 4,674,329 A | 6/1987 | Mulder |
| 4,700,413 A | 10/1987 | Lopez |
| 4,791,689 A | 12/1988 | Garcia De Couto |
| 4,804,947 A | 2/1989 | Geleziunas |
| 4,841,282 A | 6/1989 | Reis |
| 4,843,657 A | 7/1989 | Orr |
| 4,850,223 A | 7/1989 | Carlin et al. |
| 4,858,462 A | 8/1989 | Coulter et al. |
| 4,901,377 A | 2/1990 | Weir |
| 5,058,421 A | 10/1991 | Alexander et al. |
| 5,062,166 A | 11/1991 | Krenecki |
| 5,083,323 A | 1/1992 | Cannan |
| RE33,977 E | 6/1992 | Goodman et al. |
| 5,117,676 A | 6/1992 | Chang |
| 5,134,876 A | 8/1992 | Robertson et al. |
| 5,159,318 A | 10/1992 | Kronberg |
| 5,230,104 A | 7/1993 | Ocampo |
| 5,231,866 A | 8/1993 | Peacock |
| 5,232,011 A | 8/1993 | Royalty |
| 5,240,022 A | 8/1993 | Franklin |
| 5,327,931 A | 7/1994 | Royalty et al. |
| 5,416,724 A | 5/1995 | Savic |
| 5,524,299 A | 6/1996 | Dalfino |
| 5,533,383 A | 7/1996 | Greene et al. |
| 5,603,127 A | 2/1997 | Veal |
| 5,647,068 A | 7/1997 | Jensen |
| 5,675,506 A | 10/1997 | Savic |
| 5,703,569 A | 12/1997 | Oliver et al. |
| 5,940,899 A | 8/1999 | Mankin et al. |
| 6,032,303 A | 3/2000 | Schmidt |
| 6,058,519 A | 5/2000 | Quintana |
| 6,178,569 B1 | 1/2001 | Quintana |
| 6,237,412 B1 | 5/2001 | Morimoto |
| 6,269,694 B2 | 8/2001 | Morimoto |
| 6,423,213 B1 | 7/2002 | Mazurek |
| 6,776,900 B2 | 8/2004 | Mazurek et al. |
| 6,877,170 B1 | 4/2005 | Quintana et al. |
| 6,934,977 B1 | 8/2005 | Quintana et al. |
| 6,937,155 B2 | 8/2005 | Ballard |
| 7,111,638 B2 | 9/2006 | Johnson |
| 7,396,000 B2 | 7/2008 | Parsons et al. |
| 7,636,959 B2 | 12/2009 | Bowcutt et al. |
| 7,650,652 B2 | 1/2010 | Schuster et al. |
| 2003/0145371 A1 | 8/2003 | Ghertner |
| 2004/0199989 A1 | 10/2004 | Trolio |
| 2005/0109682 A1 | 5/2005 | Mazurek et al. |
| 2005/0133754 A1 | 6/2005 | Parsons et al. |
| 2005/0248465 A1 | 11/2005 | Flaherty |
| 2006/0059612 A1 | 3/2006 | Orcutt |
| 2006/0168716 A1 | 8/2006 | Schuster et al. |
| 2006/0168717 A1 | 8/2006 | Schuster et al. |
| 2007/0008111 A1 | 1/2007 | Tice et al. |
| 2007/0027579 A1 | 2/2007 | Suzuki et al. |
| 2007/0125429 A1 | 6/2007 | Kandl |
| 2008/0309503 A1 | 12/2008 | White et al. |
| 2009/0194719 A1 | 8/2009 | Mulligan |

FOREIGN PATENT DOCUMENTS

| | | |
|---|---|---|
| GB | 2218812 A | 11/1989 |
| JP | 63117222 | 5/1988 |

OTHER PUBLICATIONS

Keating, Kay, "Toiletology 101, Emergencies, Overflowing Toilet Bowl," http://www.toiletology.com/emergenc.shtml (1998).

PlumbingWorld.com, "FlowManager—prevents overflows and leaks," http://www.plumbingworld.com/toiletoverflowmanager.html (Jan. 2005).

"AquaOne FlowManager Toilet Overflow Detection," http://www.comfortchannel.com/prod.itml/icOid/1806, copyright 2005-2008.

Fluidmaster Inc., "400A Fill Valve Installation Instructions," www.fluidmaster.com (Dec. 2003).

McGinn, Daniel, "The King of Thrones," Wired 13.03 http://www.wired.com/wired/archive/13.03/toilet.html?pg=1&topic=toilet&topic_set= (Mar. 2005).

Fluidmaster Whisper With Leak Sentry Toilet Fill Valve, photos and instruction sheet (Jan. 2005).

Office Action in copending U.S. Appl. No. 12/748,793 (Jun. 16, 2011).

FLUSH (PRIOR ART)

FULL BOWL-TOILET CLOGGED
(PRIOR ART)

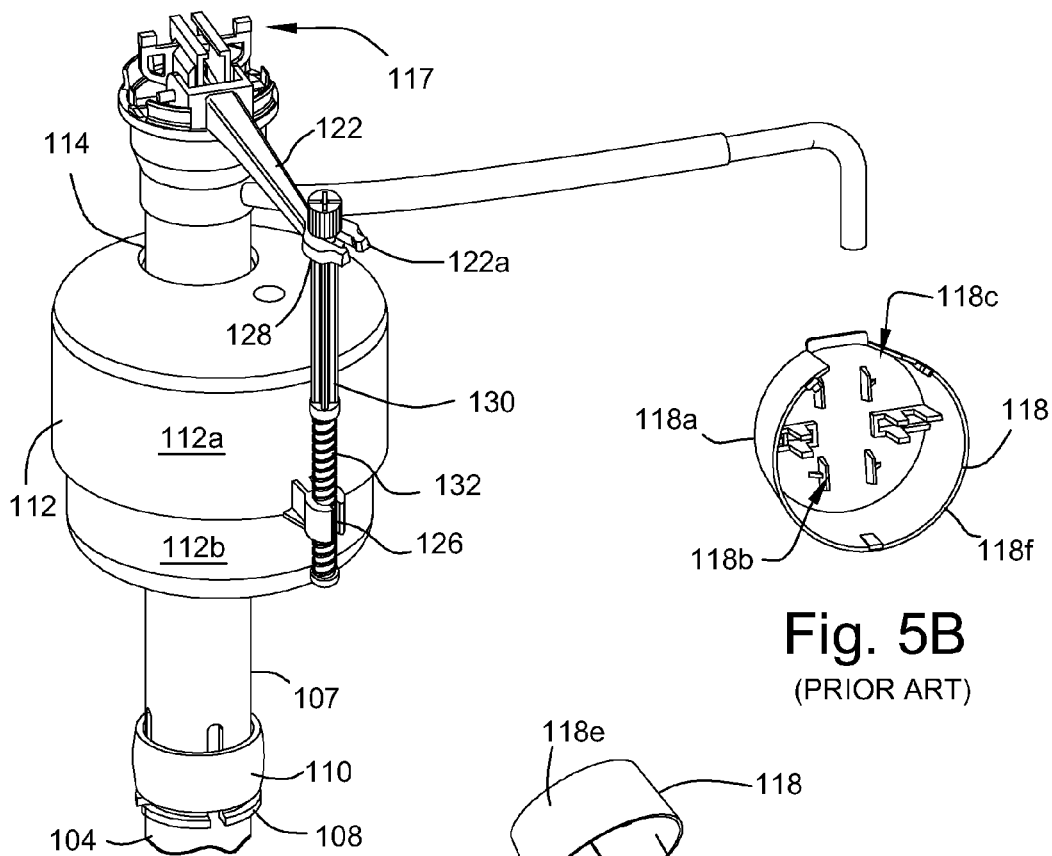
Fig. 5B
(PRIOR ART)
Fig. 5A
(PRIOR ART)
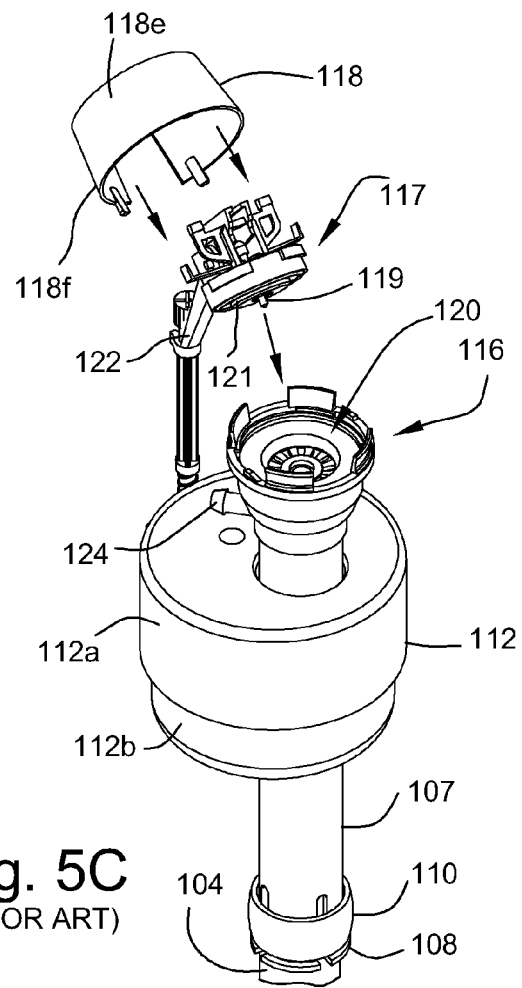
Fig. 5C
(PRIOR ART)

DETECTING A PROBLEM

STOPPING THE FLOW

DIRECT DRIVE

MAGNETIC CLUTCH DRIVE

MAGNETIC CLUTCH DRIVE

MAGNETIC CLUTCH DRIVE

MAGNETIC CLUTCH DRIVE

TOOTH CLUTCH DRIVE

TOOTH CLUTCH DRIVE

TOOTH CLUTCH DRIVE

TOOTH CLUTCH DRIVE

RIGHT ANGLE

CABLE-BASED

SOLENOID-BASED

HYDRAULIC-BASED OVERRIDE

HYDRAULIC-BASED OVERRIDE

HYDRAULIC-BASED OVERRIDE

HYDRAULIC-BASED OVERRIDE

TOILET BOWL OVERFLOW PREVENTION AND WATER CONSERVATION SYSTEM AND METHOD

CROSS-REFERENCES TO RELATED APPLICATIONS

This is application is a division of Application Ser. No. 12/036,629 filed Feb. 25,2008, allowed, which is incorporated herein by reference.

TECHNOLOGICAL FIELD

The technology herein relates to apparatus and method that can be used to prevent a toilet bowl from overflowing and/or prevent the unnecessary waste of water.

BACKGROUND AND SUMMARY

When asked to identify the invention that had the most profound impact on society over the last few centuries, most people would identify remarkable advances such as the electric light, the airplane, the telephone or the Internet. The lowly flush toilet does not come immediately to mind. Yet, the flush toilet and indoor plumbing can be said to have truly changed the world.

Medieval castles were often built with "garderobes"—private bathrooms that exhausted waste downward through a pipe into a cesspool below the castle walls. Wealthy upper class people made use of chamber pots that their servants emptied by hand. Common folk generally used outhouses for their sanitary needs, but outhouses presented all sorts of inconveniences not the least of which was the need to venture out into the cold. More significantly, unsanitary handling of human waste often spread deadly diseases—especially in cities and other areas of high population density.

Indoor plumbing and the siphon-based flush toilet eliminated all of these problems. Credit for the basic flush toilet is usually given to Sir John Harington, who lived in 16$^{th}$ century England. Harington reportedly came up with the idea of constructing a chamber pot that used running water (hydraulics) to remove waste and carry it away. Others later came up with improvements such as a water-filled trap beneath the bowl to prevent sewer gas from entering from the waste pipe and making use of a siphoning effect to rapidly evacuate the toilet bowl.

FIGS. 1, 2 & 2A show an exemplary illustrative non-limiting modern (prior art) toilet 50 comprising a tank 52 and a bowl 54. The tank 52 holds a quantity of water W. Pulling on the flush handle 56 causes a lever 58 to lift a chain 60, which in turn raises a "flapper" 62 at the bottom of the tank 52. Flapper 62 is a kind of valve that flaps open and closed. When chain 60 raises flapper 62 off of a flush valve seat, water W from the tank 52 rushes downward through an opening into the bowl 54. This inrush of water flows through rim holes 55a and siphon hole 55b (see FIG. 2A). This water inrush increases the water pressure within the bowl, forcing water through exhaust port 63 and past vapor trap 55c beneath the bowl and down into waste pipe 57. This flow of water and waste into the waste pipe 57 creates a strong siphon that evacuates the bowl through exhaust port 63, producing the characteristic flushing sound familiar to most people. In most toilets, the bowl 54 is molded so that the water enters the rim, and some of it drains out through holes in the rim. A good portion of the water flows down to a larger hole at the bottom of the bowl as shown in FIG. 2A. This hole is known as the siphon jet. It releases most of the water directly into the siphon tube. Because all of the water in the bowl enters the tank in a very short time (e.g., three seconds), it is enough to fill and produce the siphon effect, and all of the water and waste in the bowl is sucked out.

When nearly all of the water has escaped from the tank 52, the flapper 62 descends back down to its original position as shown in FIG. 2, once again sealing the water passage between the tank and the bowl 54. Fresh tap water flowing into the tank 52 through a fill valve 66 from an inlet pipe 64 begins to fill the tank. A float 112 rises with the rising water level. When the float 112 reaches a preset level, it closes the fill valve 66 and water ceases to flow into the tank 52. The toilet 50 is now ready for another flush.

While toilets are generally reliable, they can malfunction from time to time. Perhaps the most common malfunction is when the flapper 62 remains open, leaks or is misaligned, causing the toilet to "run." A stuck-open flapper 62 can waste a lot of water. This can be a serious problem, especially in cases of water shortages or droughts. Sometimes the fix is as simple as jiggling the flush handle 56. Other times, it is necessary to replace the flapper 62. It is often possible to detect the flapper 62's failure to close by listening for water running continuously into the tank 52. Sometimes, however, people are not home to hear the water running. People who are hearing impaired may not be able to hear water running. Hundreds of gallons of water can be wasted in this way in a relatively short time. Some readily available water authority surveys estimate that of the approximately 240,000,000+ toilets in the United States, as many as one in five may be leaking to some extent.

A running toilet can waste a lot of water but usually does not present health hazards. An overflowing toilet, on the other hand, can be a serious household hygiene disaster—as anyone who has ever had to clean up the consequences knows very well. Watching water rise to the top edge of a toilet bowl is a fearful experience. Overflowing toilet bowls can spread germs and disease, cause structural damage to homes and businesses, contribute to toxic mold, and cause other bad effects.

FIG. 3 shows a clogged toilet situation. When debris (e.g., a child's toy, excess quantities of toilet paper, etc.) blocks the toilet exhaust port 63 or further down waste pipe 57, flushing the toilet does not cause the bowl 54 to evacuate. Instead, the water level within bowl 54 continues to rise as water from the tank 52 rushes downward into the bowl. In many instances, the water will stop rising before the toilet overflows. This is because most toilet bowls 54 are designed to hold the entire contents of the tank 52 without overflowing—but only if the water in the tank falls low enough to allow the flapper 62 to seat so as to prevent further water from flowing into the bowl 54. Overflow can occur with just a single flush when a blocked siphon hole (see FIG. 2A) prevents the rapid evacuation of the water in the tank 52 while the fill valve 66 is open.

Toilets can also overflow if the water level in the bowl 54 starts out higher than normal when the toilet is flushed. As FIG. 4 shows, when a toilet bowl 54 is clogged so that a flush doesn't flush the bowl's contents away, some people will flush the toilet a second time in the hope that the additional water will push the bowl contents down through the outlet pipe 63. Additional flushing rarely clears the clog, but can easily cause a toilet bowl to overflow.

Parents should warn their children that when the water level in a toilet bowl is higher than normal, the toilet should not be flushed again. Unfortunately, it is common for children and others who do not know better to flush a toilet repeatedly in the hope that repeated flushing will eliminate the blockage.

Many in the past have tried to use technology to prevent toilets from overflowing or wasting water. Generally speaking, the solutions that exist to date are unsatisfactory. Some are ineffective, others are too expensive, and others are too difficult to install. One existing solution involves placing an electronic valve in the fluid fill line 64. Such installation requires plumbing knowledge. Other known solutions involve special toilet designs that provide overflow plumbing. None of these approaches has been widely adopted, so the troublesome problems of toilet overflow and water waste still exist. It is a significant challenge to solve these problems for the large number of toilets already installed in millions of homes and businesses.

What is needed is a simple, yet effective, reliable, relatively inexpensive solution that can be used with both new and already existing toilets and which can be easily installed and operated with high reliability.

The exemplary illustrative non-limiting technology described herein provides a new and useful single self-contained apparatus, located completely within the toilet tank, which can detect and prevent a toilet overflow and/or limit the unnecessary waste of water through a leaking flapper.

Exemplary illustrative non-limiting technology is for use with a toilet tank fill valve comprising a float and a water valve that operates in response to float position. A protective cap at least in part covers the water valve. As usual, the water valve selectively admits water into the toilet tank. An improved system and method for use with such a fill valve compatibly mounts on the fill valve protective cap and conditionally interferes with or overrides the operation of the toilet tank fill valve.

Exemplary illustrative non-limiting steps include removing the toilet tank lid to provide access to the toilet tank fill valve therewithin, manually snapping an assembly onto said fill valve cap, and automatically and conditionally actuating the assembly to cause the assembly to selectively interfere with the operation of said toilet tank fill valve e.g. thereby preventing a further toilet flush.

A further exemplary illustrative non-limiting device for use with a toilet tank fill valve assembly comprises an attaching structure for manual attachment to the fill valve cap. A control mechanism supported by an attaching structure acts to conditionally interfere with the operation of the toilet tank fill valve assembly to prevent overflows and/or water waste.

Further exemplary illustrative non-limiting features and/or advantages include:

An attaching structure that can be manually attached to the fill valve without use of specialized tools.

A control mechanism comprising an arm member that, in response to sensed water flow within the tank, conditionally raises the float instead of relying (just) on rising water level to raise the float.

An attaching structure comprising a flexible structure that snaps onto the existing fill valve protective cap or, alternatively, replaces the cap.

Some designs require no disassembly of or modification to a conventional fill valve design.

An attaching structure that comprises a dome element that can snap over a conventional fill valve protective cap.

An attaching structure that includes fingers that snap over the cap.

An attaching structure that does not interfere or impede the normal operation of a toilet tank fill valve until a control mechanism is activated to cause conditional interference.

An electrical actuator that actuates a control mechanism to conditionally interfere with the operation of a toilet tank fill valve assembly in response to an electrical control signal.

A control member comprising a member that additionally retains the float of a toilet fill valve in an uppermost position.

A control mechanism that includes a filament, a rod, an electric motor, hydraulic piston, hydraulic-activated lever, and/or a solenoid.

An attaching mechanism that includes a portion for engaging a cylindrical surface of said cap, said engaging portion having a dimension of approximately 50 cm in diameter and 25 cm in height.

A device that is dimensioned so as not to interfere with typical placement of a toilet tank lid.

A device that comprises materials designed to be substantially impervious to degradation by water and/or toilet tank contaminants.

An attaching structure that can be non-destructively removed from the protective cap.

An attaching structure that can be manually removed from the fill valve.

No direct connection between said device and a flush handle of the toilet.

A control mechanism that is resettable to cease interfering with fill valve operation.

A control mechanism that is resettable manually or automatically.

A practical cost-effective product that is virtually impervious to the harsh environment common to toilet tanks, reliable in operation, unaffected by changes in fluid viscosity and conductivity, simple in construction, and inexpensive to manufacture and implement.

Universal application to the many different types of toilets and their varying tank sizes.

Ideally adaptable and installed without the end-user being forced to make any modifications.

Ruggedly and compactly designed in a way that will allow it to be installed inside the toilet tank itself.

A layperson should be able to install it in a few minutes, without the use of any tools or the user being forced to touch or handle any part of the toilet, except for the toilet tank lid, with simple instructions.

A single-piece system that determines when a toilet bowl overflow is about to happen and prevents it from taking place.

A system that emits an audible signal when (a) it has reacted to a possible overflow, (b) when the batteries require replacement, and (c) when and if built-in diagnostics determine that it is inoperable.

No aesthetic compromise of the toilet and/or bathroom (device presence and operation are invisible to bathroom occupants).

The batteries reliably operate the unit for a long time (e.g., a minimum of 12 months).

The retail cost to the consumer is below twenty dollars, so that the landed or manufacturing cost (in quantity) of the products can be below four dollars.

Exemplary implementations include original equipment manufacturer version having a overflow prevention and water conservation feature as described herein as part of its normal and intended operation.

BRIEF DESCRIPTION OF THE DRAWINGS

These and other features and advantages will be better and more completely understood by referring to the following detailed description of exemplary non-limiting illustrative embodiments in conjunction with the drawings of which:

FIG. 5A shows an elevated perspective detail of the FIG. 5 conventional prior art water fill valve with protective cap removed;

FIG. 5B shows an elevated perspective detail of the inside of the FIG. 5 prior art fill valve protective cap;

FIG. 5C shows a more detailed partially disassembled view of the FIG. 5 prior art conventional fill valve;

DETAILED DESCRIPTION

Figure 1:
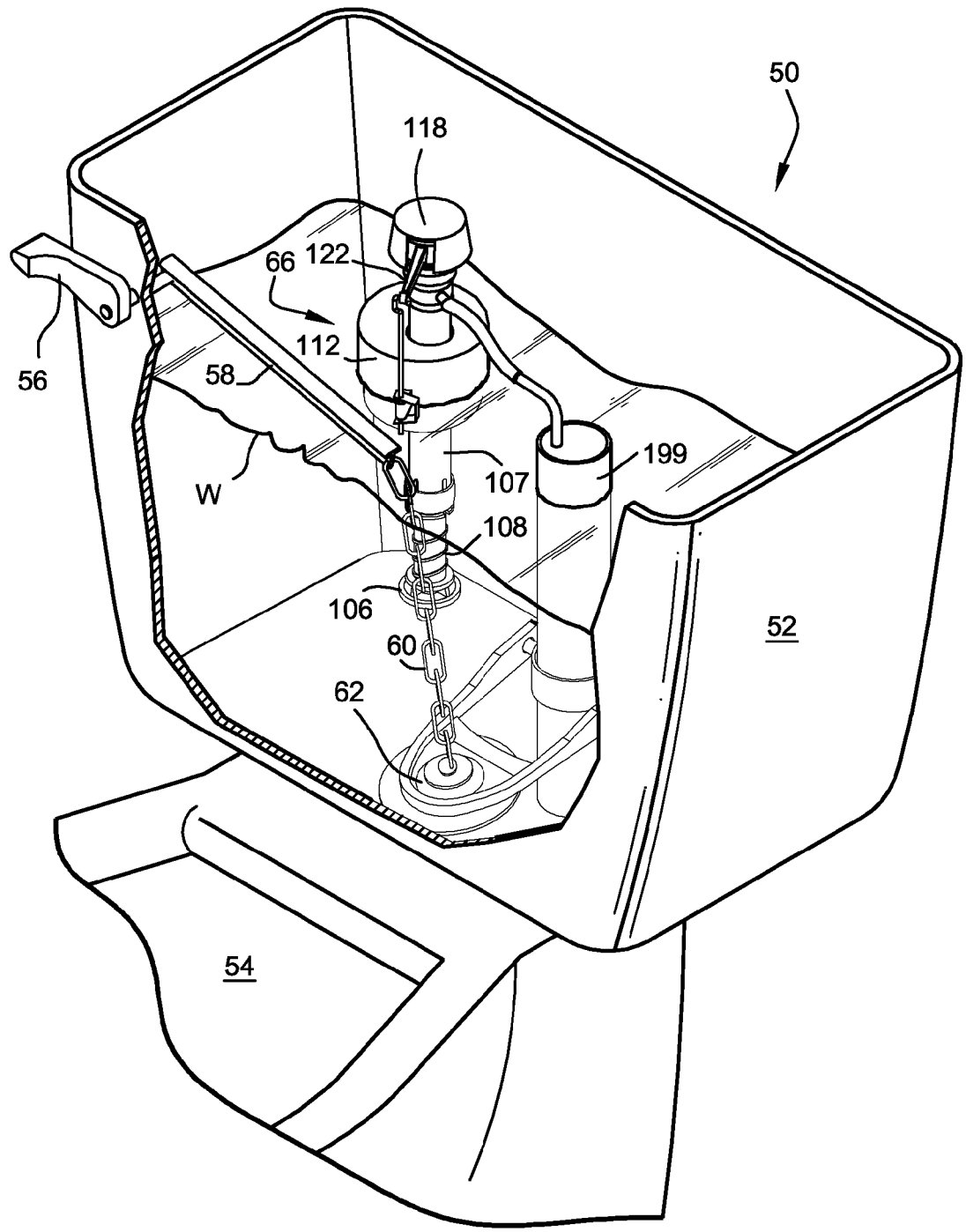
FIG. 1 is a cutaway view of an example non-limiting exemplary conventional prior art toilet tank.

An illustrative non-limiting exemplary toilet overflow prevention and water conservation device in at least some of its implementations may be used in combination with a standard conventional toilet fill valve of the type that can be purchased in many hardware stores and home centers across America. Using the illustrative non-limiting overflow prevention and water conservation device implementation in combination with a conventional toilet fill valve provides a simple way to control water flow into the toilet tank without requiring modification to standard conventional toilet plumbing.

An exemplary illustrative non-limiting approach modifies the conventional toilet fill valve configuration to provide an additional operating mode or water fill valve deactuation method. This additional operating mode or water valve deactuation method responds to sensed water flow parameters (e.g., sensed imminent toilet bowl overflow and/or a sensed water leak, such as a leaking or open flapper) by acting on the conventional fill valve to reduce or terminate water flow. Such water flow reduction or termination can reduce or eliminate wasted water and can in some cases also prevent hazardous or unsanitary toilet overflow and general water damage.

While it would be possible to control water inflow at some point other than the fill valve within the toilet tank (e.g., by controlling the inline valve often found external to the toilet or a solenoid or other actuated valve installed in the toilet's water supply line), the conventional toilet fill valve 66 is already designed to reliably control the flow of water into the toilet tank, and conventional feed tubes and other cold water plumbing are fully compatible with such fill valves. Accordingly, the exemplary illustrative non-limiting implementations provide certain advantages by providing or enhancing the operation of a toilet fill valve 66 to limit or prevent overflow and/or conserve water by providing a conditional, override mechanism for controlling the fill valve that acts independently of the buoyancy of the fill valve's float.

Depending on the desired application, the exemplary illustrative non-limiting implementations provide toilet fill valve configuration modification by a toilet and/or fill valve manufacturer at time of manufacture; by the end user before, during or after installation of the fill valve into a toilet; by the end user after the fill valve was installed in a toilet; or at any other time. Thus, some exemplary illustrative non-limiting implementations can provide a retrofit aftermarket solution with or without modification to the conventional fill valve. Other exemplary illustrative non-limiting implementations can provide original equipment manufacturer solutions that modify the fill valve design.

Exemplary illustrative non-limiting overflow prevention and water conservation device implementations described herein are designed to provide easy and quick installation without tools or detailed instructions. The exemplary illustrative non-limiting implementation is also invisible once installed (i.e., housed entirely within the closed toilet tank). Most end users want to minimize contact with the water within the toilet and the toilet itself, so exemplary illustrative non-limiting implementations can allow for installation without need for the user's hands to contact the water and only the toilet tank cover or lid.

Exemplary Illustrative Non-Limiting Retrofit and OEM Solutions for Use With Conventional Toilet Fill Valve Designs The exemplary illustrative non-limiting technology herein is useful with toilet tank fill valves or other mechanisms and designs in the United States, Europe, Japan and anywhere else in the world. Certain features of one exemplary illustrative non-limiting implementation described below provide compatibility with the particular, widely used prior art fill valve design such as shown in FIG. 5, 5A-5C. The particular prior art fill valve 66 design shown in FIGS. 5, 5A-5C is simply a non-limiting example—many other mechanisms exist for controlling the inflow of water into a toilet tank, and the exemplary illustrative non-limiting technology herein can be used with any such mechanisms.

FIGS. 5, 5A, 5B and 5C show various elevated perspective views of one conventional illustrative non-limiting exemplary toilet tank fill valve 66 that has achieved wide acceptance in the marketplace and is therefore a natural and advantageous fill valve design to enhance by using it with an illustrative non-limiting exemplary toilet overflow prevention and water conservation device. The particular non-limiting example fill valve 66 shown in FIGS. 5, 5A-5C is a prior art Toilet Tank Fill Valve Model 400 manufactured by Fluidmaster Inc., 30800 Rancho Viejo Road, San Juan Capistrano, Calif. 92675 and described for example in U.S. Pat. Nos. 4,327,941 and 4,703,653 incorporated herein by reference. The fill valve design shown in FIGS. 5, 5A-5C is "prior art" to the subject matter claimed herein and can be purchased at your local hardware store or home center. However, for a better understanding of one exemplary illustrative non-limiting implementation of a toilet overflow protection and water conservation system and method described herein, it will be helpful for the reader to more fully understand how the non-limiting example prior art fill valve shown in FIGS. 5, 5A-5C works in a conventional toilet. Accordingly, the structure and operation of this conventional illustrative non-limiting prior art fill valve 66 will first be described. Then, modifications to this conventional fill valve 66 will be described that change and/or enhance its operation. For even more detail about how a conventional toilet works, see the website "How Stuff Works" (which includes an animation) and the Fluidmaster website, both incorporated herein by reference.

Exemplary Prior Art Fill Valve Design and Operation

As explained above, conventional fill valve 66 functions to control the flow of water into the tank 52 of a toilet 50. The fill valve 66 allows water to flow into the tank 52 until the tank is full, and then stops the flow of water. When the toilet 50 is flushed, the fill valve 66 senses the decrease in water level within the tank 52 and once again allows water to flow into the tank until the tank is again full.

Briefly, the fill valve 66 senses the decrease in water level based on the position of a buoyant "float" 112 that floats on the surface of the water within the toilet tank 52. When float 112 falls, this typically indicates that the water level within tank 52 has dropped because someone has flushed the toilet. Fill valve 66 responds by letting more water flow into the tank 52. When float 112 rises to a certain height, fill valve 66 responds by stopping the flow of water into the tank 52. This is the basic principle on which most flush toilet tanks have operated for decades, including for example "old fashioned" or alternative "ball cock" style floats made from copper, brass, rubber or other constructions.

Figure 2:
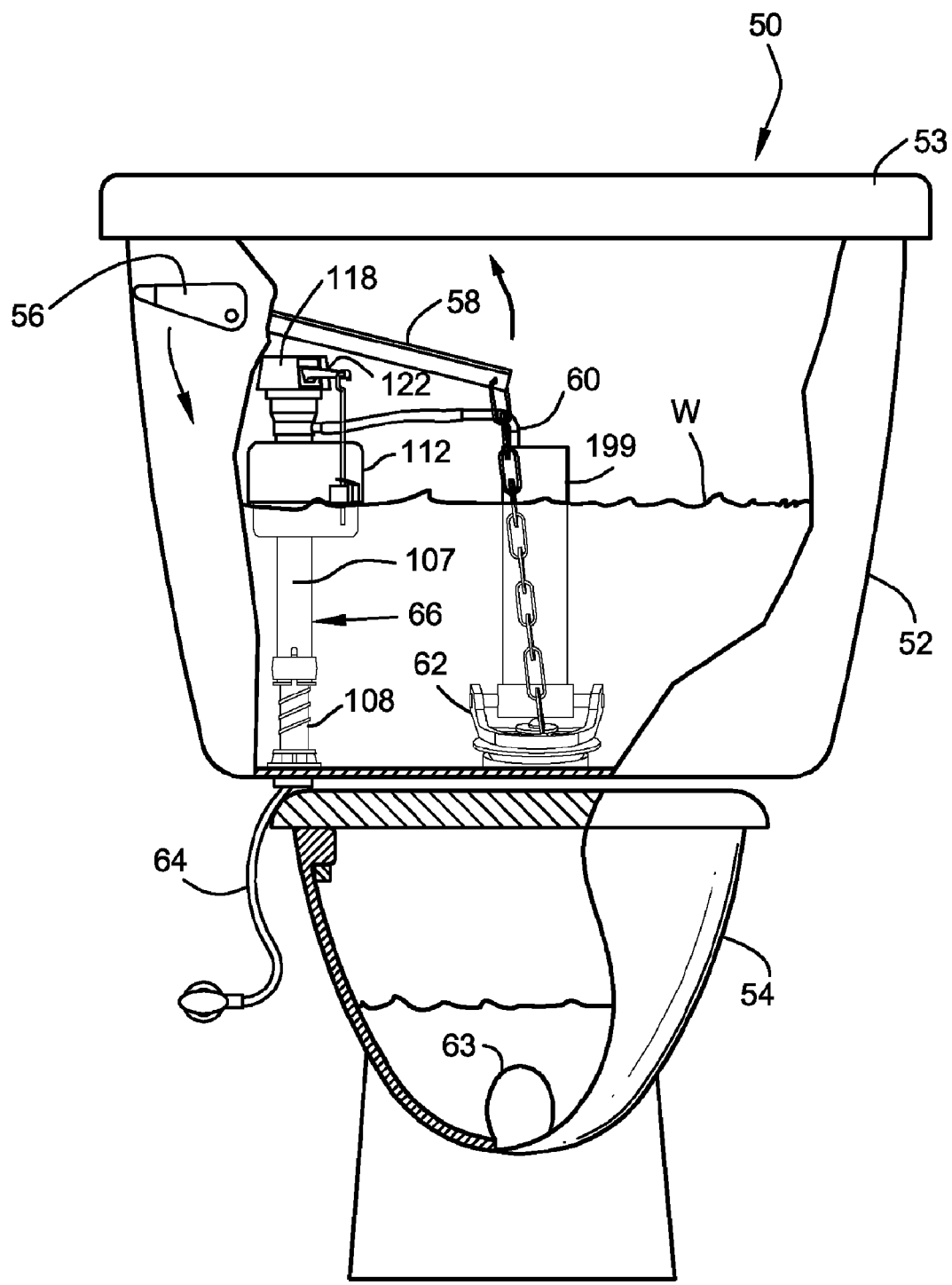
FIG. 2 shows the FIG. 1 conventional prior art toilet tank and conventional toilet bowl about to be flushed.
Figure 2A:
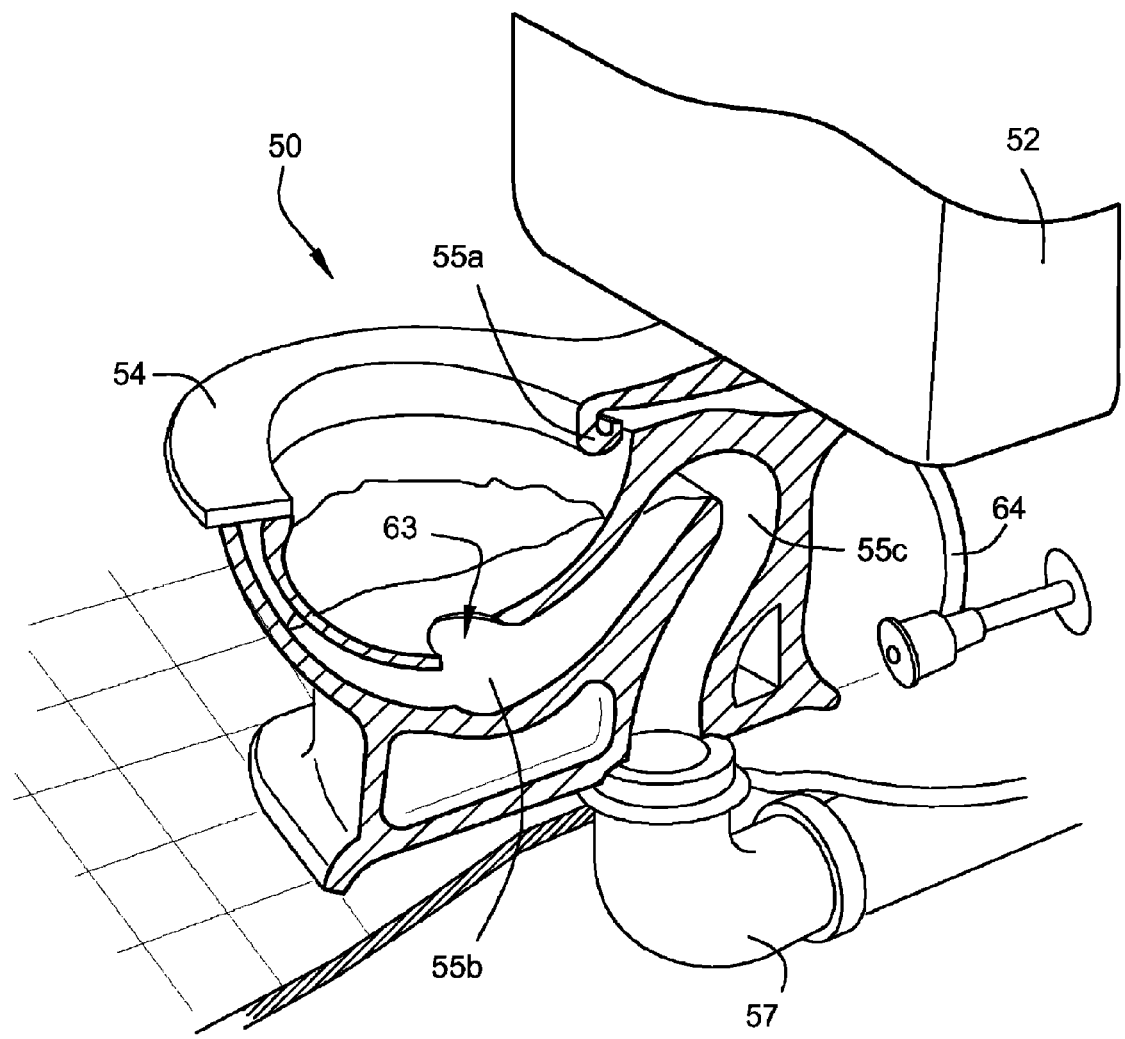
FIG. 2A shows conventional prior art toilet tank internal plumbing details.
Figure 5:
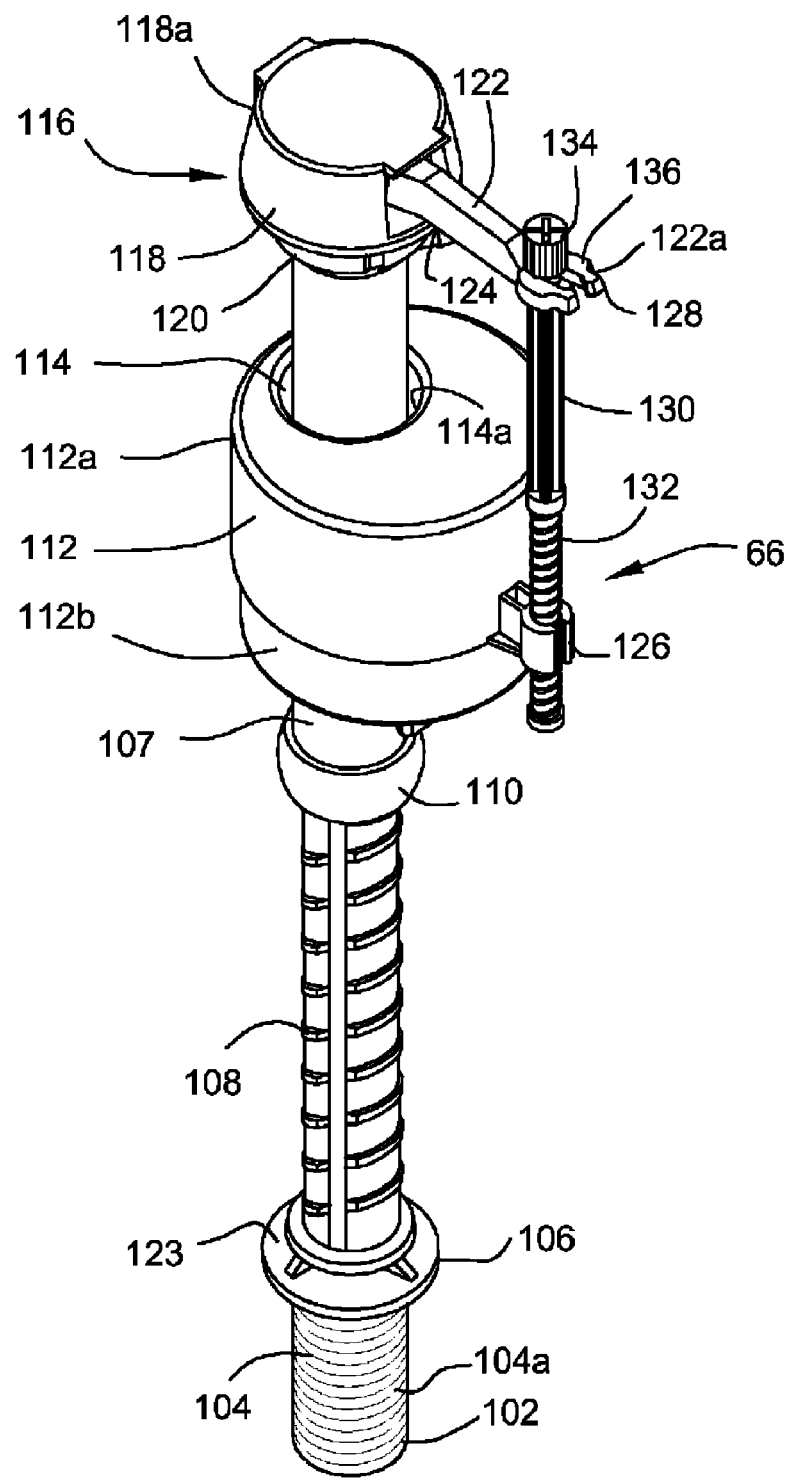
FIG. 5 is an elevated perspective view of an exemplary illustrative non-limiting conventional prior art water fill valve.

In more detail, the particular conventional fill valve 66 shown in FIG. 5 includes a shaft like valve body 102 with a stem 104 that protrudes through a hole in the bottom of a toilet tank 52. Water under pressure from a household or other cold water plumbing system is fed through the stem 104 into the valve body 102. A conventional cold water feed toilet tank fitting is used to feed pressurized water from the cold water feed line (see FIG. 2A) into the stem. Threads 104a may mate with a conventional lock nut (not shown) to firmly attach and seal the fill valve 66 to the toilet tank 52. A flange 106 and associated shank washer forms part of this seal and also supports the fill valve 66 so it remains in a vertically upright position within the tank 52.

A threaded shank 107 concentric to and surrounding fill valve body 102 provides a height adjustment mechanism. By rotating shank 107 relative to valve body 102, the sleeve ascends or descends on the valve body along threads 108. This height adjustment allows the end user to adapt fill valve 66 to a variety of differently sized toilet tanks and plumbing fixture arrangements. A plastic ring 110 retains the shank 107 on valve body 102 so that it does not slip off under location by the end user. One exemplary illustrative non-limiting implementation provides a height adjustment of up to five inches using this arrangement. See "Fluidmaster 400A Fill Valve Installation Instructions" Part No. 4-743 Rev. 1 (8/05) incorporated herein by reference.

Float 112 is retained by, and moves relative to, valve body 102. In this particular exemplary illustrative non-limiting design, float 112 includes an upper portion 112a and a lower portion 112b. Upper portion 112a and lower portion 112b are each hollow cups. Upper and lower portions 112a, 112b are fastened together using conventional techniques to provide a waterproof fastening and thereby function as a flotation device, which is buoyant and therefore floats on or near the surface of the water.

In the exemplary illustrative non-limiting implementation, float 112 has defined therethrough a cylindrical channel 114. Cylindrical channel 114 has a diameter that exceeds the outer diameter of shank 107. Float 112 is designed so that the cylindrical channel inner wall 114a also provides a waterproof barrier to the hollow interior of float 112. In some implementations, ridges that are vertically oriented on the cylindrical channel wall 114a nearly contact or do contact the shank 107 outer diameter to provide a low friction centering arrangement that is resistant to trapped debris and allows float 112 to freely move vertically on shank 107 as the water level changes within a toilet tank.

As shown in FIG. 5C, at an upper end portion 116 of fill valve 66, a protective cap or top 118 is used to protect an internal needle valve 117 that is disposed within an upper valve body 120. Needle valve 117 is a pin diaphragm type valve. A pin 119 is connected to a sealing diaphragm 121. When lever 122 is pushed up, the pin 119 pushes down on the diaphragm 121 which seals the valve so no water flows through the fill valve 66. When lever 122 moves vertically downward, the pin 119 lifts the diaphragm 121 to open the seal. The needle valve 117 opens and water is permitted to flow from valve body 102 to outlet port 124 and also down through valve body 102 to water exit ports 123 at the bottom of the fill valve near flange 106.

As shown in FIGS. 5B and 5C, protective cap 118 protects the needle valve 117 but is not involved in the operation of the valve. This cap 118 has a snap fit, and is designed to be removable to allow users to clean or replace the needle valve 117. Retaining projections 118b molded within the inside of cap 118 allow the cap to be removably snap-fit onto mating structures 117a extending from needle valve 117.

In this exemplary illustrative non-limiting implementation, there is a partially cylindrically channeled, threaded retaining projection 126 formed integrally with or attached to float upper portion 112a (see FIG. 5A). An end 122a of lever 122 terminates in a horseshoe shaped retaining portion 128. A vertically oriented water level adjustment rod 130 is loosely coupled to the lever end 122a and to projection 126. Rod 130 may provide a threaded portion 132 to provide adjustability. The rod 130 is retained within the horseshoe-shaped portion 128. An end user can rotate rod 130 to provide adjustments between the rod threads 132 and threaded projection 126.

In use, when flush handle 56 is depressed, flapper 62 opens and tank 52 evacuates into bowl 54. This causes the water level in tank 52 to drop. Gravity then exerts a downward pull on float 112. This causes float 112 to descend along shank 107. Rod 130 descends with float 112. As rod 130 descends, it exerts a downward force on lever 122. This downward force on lever 122 causes the lever to pull up on pin 119, which causes the needle valve 117 to open and water to flow through the fill valve 66 into the toilet tank 52.

As the water level within the tank rises, it eventually contacts float 112. As mentioned above, the float 112 is buoyant and floats on or near the surface of the water. As the water level increases, it raises the level of float 112. As float 112 rises, it exerts an upward pressure onto rod 130 which in turn raises the lever 122. When the lever 122 has been raised sufficiently, it exerts a downward force on pin 119 to seal the needle valve 117. Water then ceases to flow into the tank through fill valve 66. In this state, the toilet tank is full and the toilet is ready to be flushed.

When the toilet is flushed, the water level within the tank rapidly falls. The descending water level within the tank allows float 112 to fall under the force of gravity. As the float 112 falls, it exerts a downward pressure through rod 130 onto lever 122 that again opens the needle valve 117 and allows water to begin flowing through fill valve 66 into the toilet tank 52. This in turn, under normal conditions (i.e., assuming flapper 62 is closed), causes the water level within the tank to again rise, causing float 112 to rise again and eventually turn off the flow of water into the tank.

It should be apparent that the fill valve 66 shown in FIGS. 5, 5A, 5B and 5C is well designed, highly reliable and is capable of delivering long periods of trouble-free service, further evidenced by the millions of valves sold annually by the manufacturer through hardware stores and home improvement centers. However, it should also be apparent that the operation of fill valve 66 depends entirely on the position of float 112. When float 112 is in its lower position, fill valve 66 allows water to flow into the toilet tank 52. When float 112 is in its uppermost position, flow valve 66 stops water from flowing into the toilet tank 52. The operation of fill valve 66 is thus completely dependent on the position of float 112, which in turn is completely dependent (under normal conditions) on the height of the water within the toilet tank 52.

Suppose the float 112 were to become detached, or the filler valve 66 was to jam so that it never cut off. Theoretically, the tank 52 would overflow and flood the bathroom. But the overflow tube 199 is there to prevent that from happening, directing the extra water into the bowl instead of onto the floor. So conventional toilet mechanisms have been designed to prevent overflow due to this type of malfunction of fill valve 66.

Now suppose that flapper 62 becomes stuck in an open position or is misaligned or otherwise does not seal properly. The fill valve 66 may never fill the toilet tank 52 with sufficient water to raise float 112 to an upper position. Instead, all water that fill valve 66 delivers into toilet tank 52 might be immediately (or soon) exhausted through the passage between the tank 52 and bowl 54 that flapper 62 is designed to seal under normal (non-flushing) conditions.

If the water that fill valve 66 is delivering into tank 52 escapes into the toilet bowl 54, the water level within tank 52 may never rise and float 112 will similarly remain in a lower position. The toilet will continuously "run." Water will continue to flow through fill valve 66 through the toilet into the waste line 57 as long as flapper 62 remains open. This "running" condition can persist until a user takes corrective action to cause flapper 62 to close and seal. Even though fill valve 66 in this situation is operating exactly as it was designed to operate, the toilet 50 is seriously malfunctioning and wasting huge amounts of water. During periods or in regions of water shortage, this water waste can be a real problem. In a house with its own well, the owner of toilet 50 may potentially pump his or her well dry. If the house is connected to city water, the owner may receive a huge water bill for water that flows through the toilet and is wasted. In communities such as though located alongside rivers or water basins where water waste is stored in portable in-ground septic tanks to avoid contamination, a "running" toilet can overflow a tank, causing water damage while simultaneously draining into the nearby drinking water supply that the in-ground tank was supposed to protect.

Figure 3:
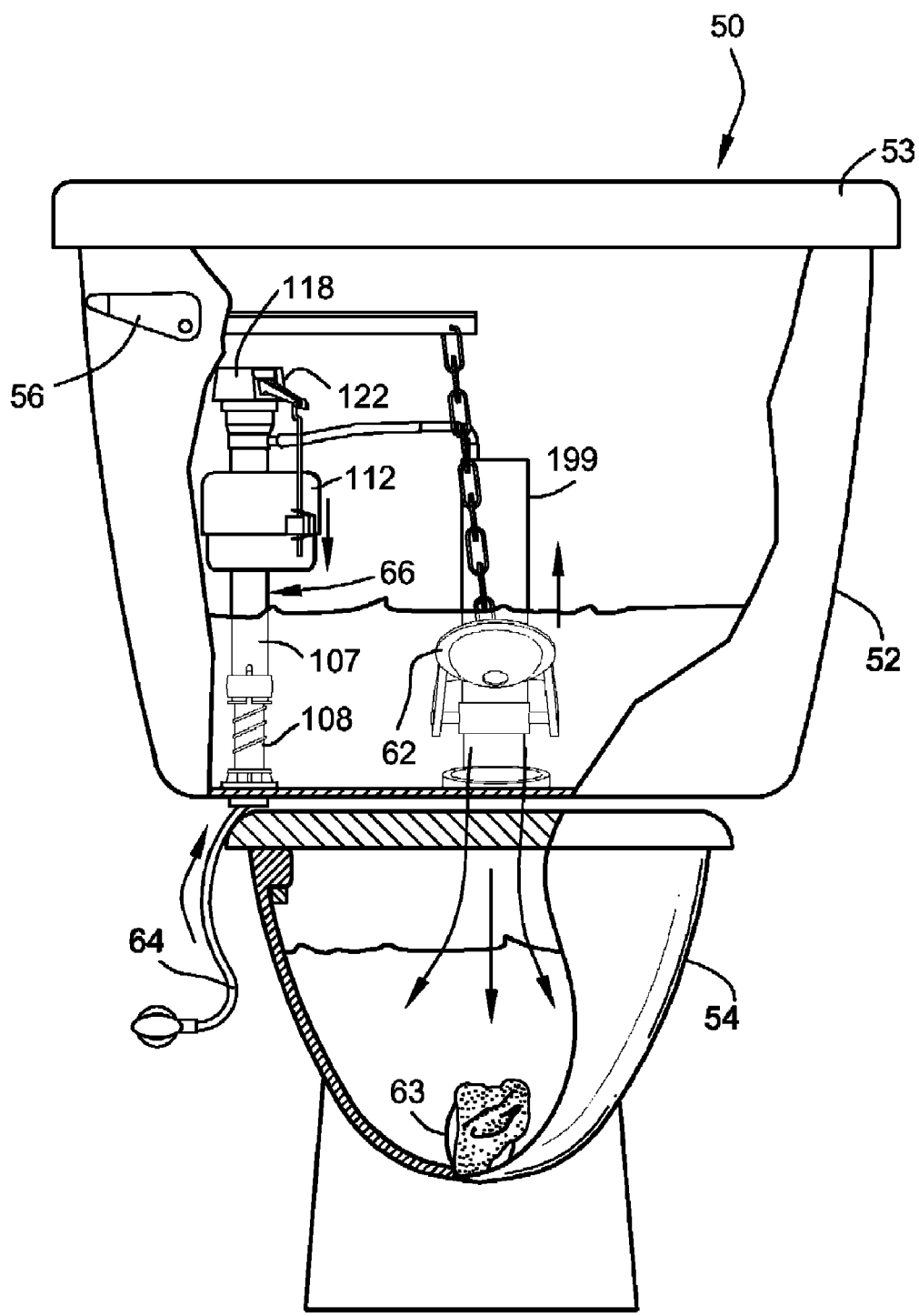
FIG. 3 shows the conventional prior art FIG. 1 tank during a flushing operation into a clogged bowl.
Figure 4:
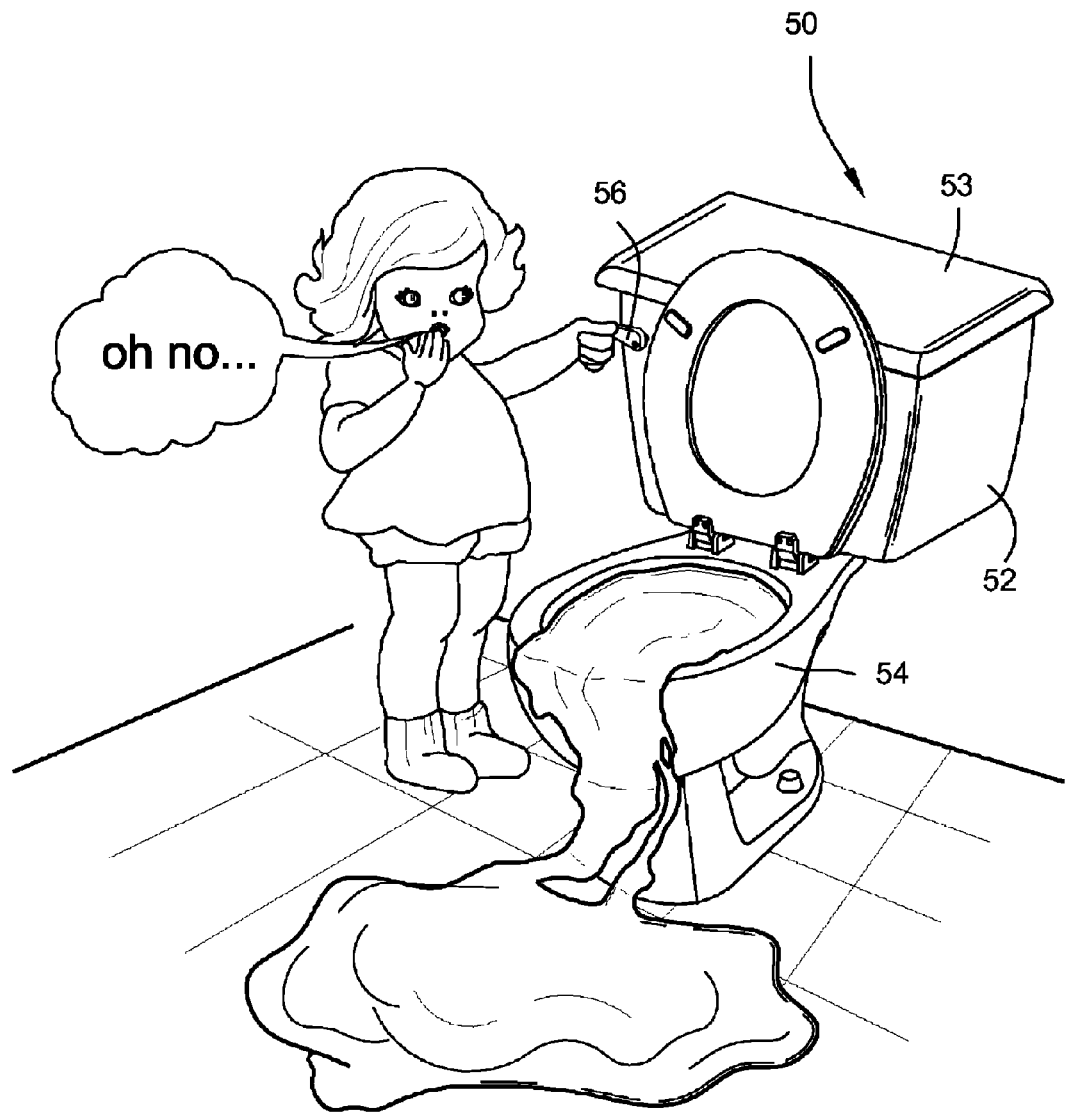
FIG. 4 shows overflow of a conventional toilet.

Consider now the situation shown in FIG. 3 where the toilet bowl 54 is clogged. If the flapper 62 fails to close, the overflow can occur immediately. Suppose however that the flapper 62 falls closed as it is supposed to do when the tank 52 is emptied. This situation will allow water flowing through fill valve 66 to begin filling tank 52. If fill valve 66 operates normally, it will continue to fill the tank 52 until float 112 has risen sufficiently to close the fill valve. Now the toilet tank 52 is full of water and the toilet is ready to flush once again. Unfortunately, bowl 52 is also full of water. Any additional water delivered into the bowl cannot escape through waste pipe 57 due to the blockage 63. Another flush (i.e., by pulling on flush handle 56) will nevertheless once again open flapper 62 and cause the water within tank 52 to be expelled into the already-full bowl 54. This can cause an overflow of bowl 54, as shown in FIG. 4. The overflow occurs even though fill valve 66 is operating completely normally and functioning exactly as it was designed to function.

It can thus be seen that the normal, intended operation of fill valve 66 can sometimes cause problems depending upon operation of other elements within toilet 50 beyond the control of the fill valve. It would be desirable to enhance or modify the operation of fill valve 66 so that its normal filling operation is selectively overridden or interfered with under certain circumstances (e.g., when water is being wasted or an overflow is imminent).

Figure 6:
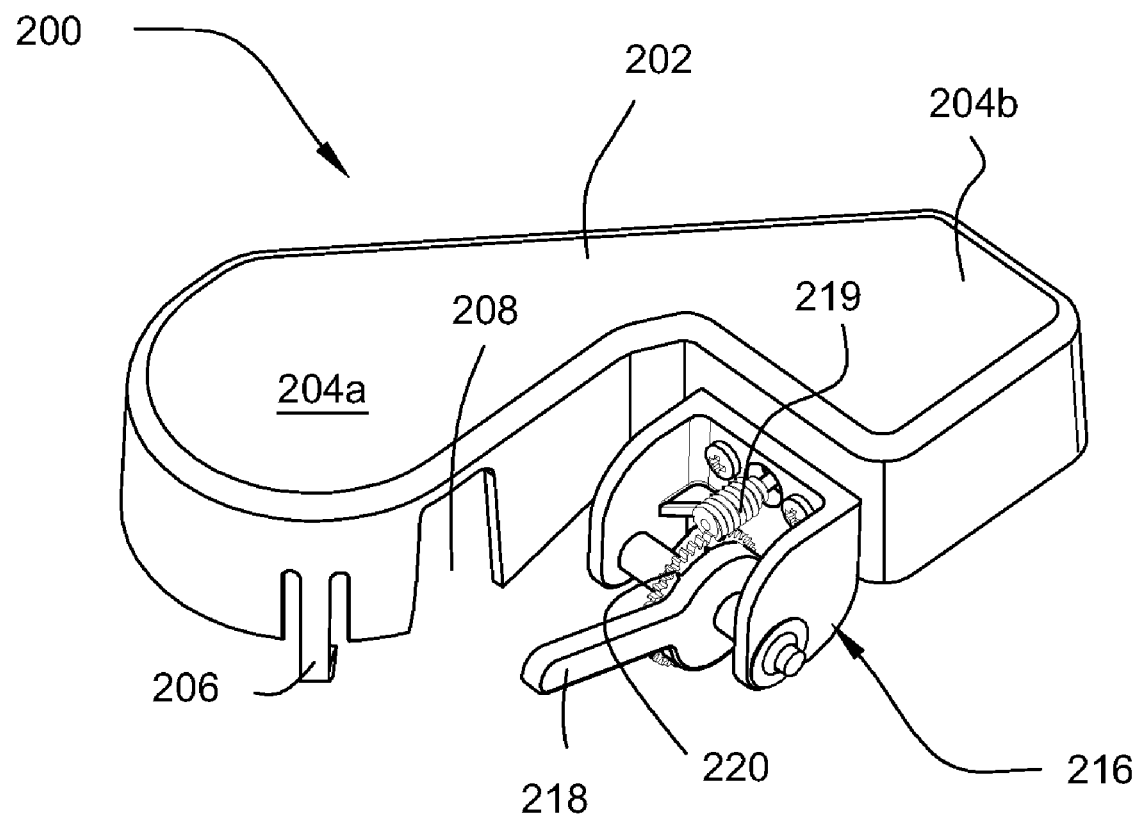
FIG. 6 shows an exemplary illustrative non-limiting toilet overflow prevention and water conservation device.
Figure 6A:
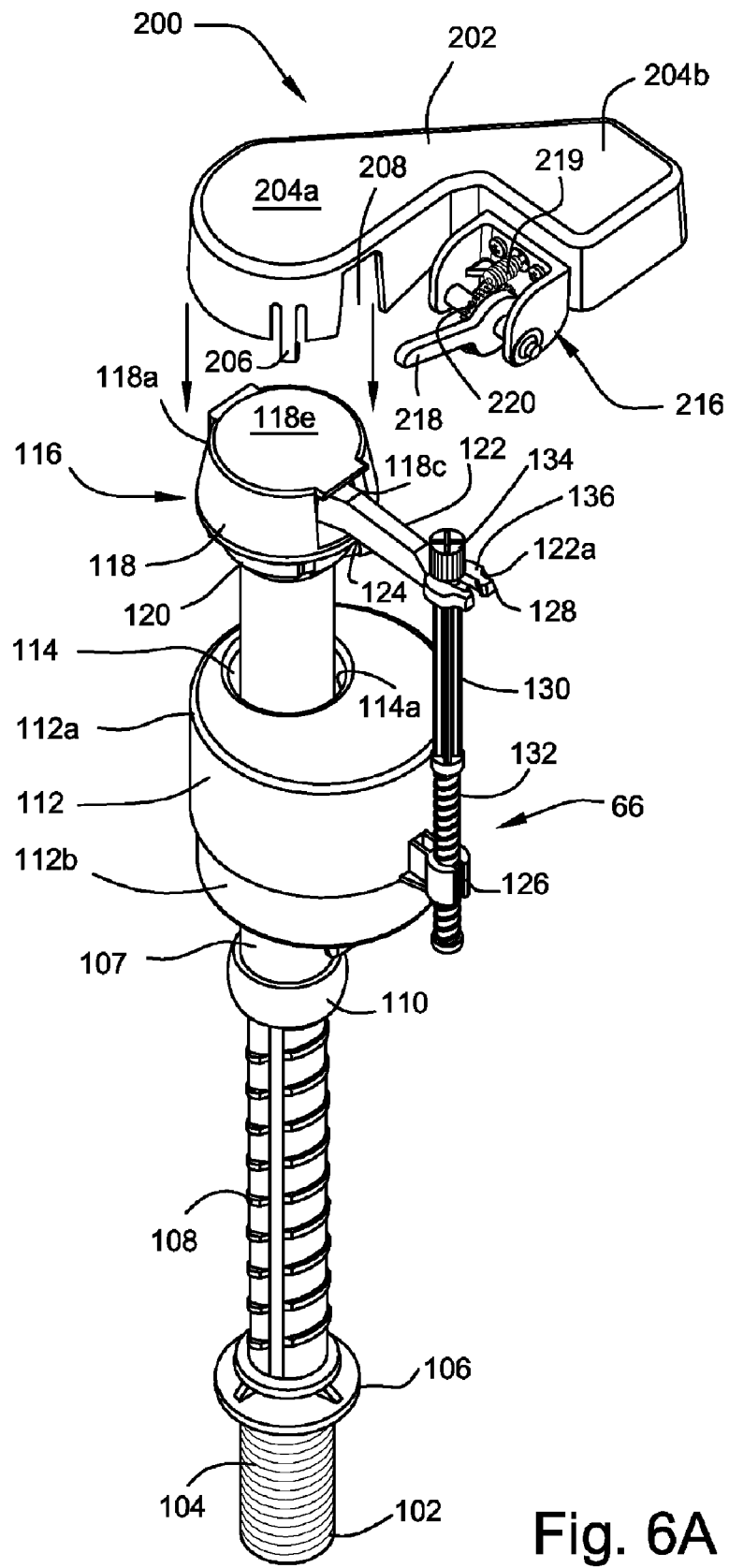
FIG. 6A is an elevated perspective view of the FIG. 6 exemplary illustrative non-limiting toilet overflow prevention and water conservation device placed for installation onto the FIG. 5 conventional water fill valve.

Exemplary Illustrative Non-Limiting Toilet Overflow Prevention and Water Conservation Device FIG. 6 shows an exemplary illustrative non-limiting implementation of a toilet overflow prevention and water conservation device 200. FIG. 6A shows device 200 in combination with a conventional fill valve 66.

In the exemplary illustrative non-limiting implementation shown in FIGS. 6 and 6A, toilet overflow prevention and water conservation device 200 includes a housing 202 having a portion 204a that is mountable on and supportable by conventional fill valve 66 of FIG. 5, as will be explained below. Housing 202 houses components that selectively override or interfere with the normal operation of fill valve 66 in response to detected water flow characteristics within tank 52, as also explained below.

Exemplary Illustrative Non-Limiting Mounting Technique and Arrangement

Figure 8A:
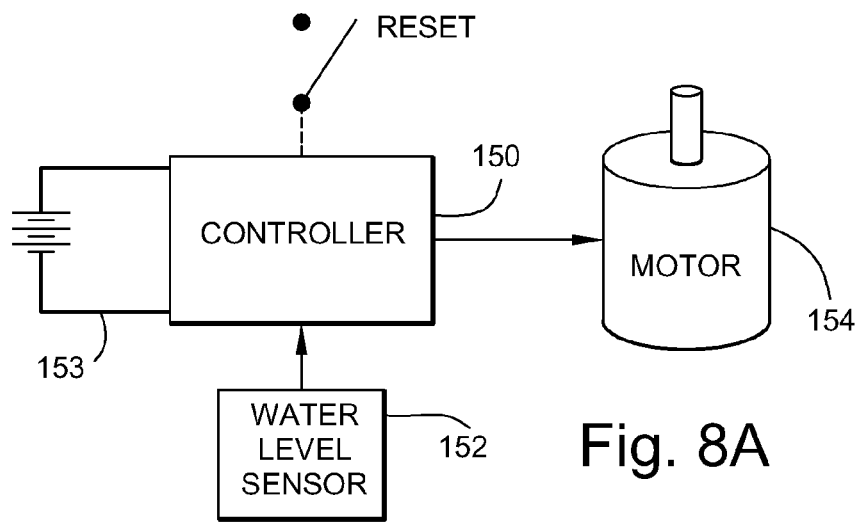
FIG. 8A is a block diagram showing exemplary non-limiting electronic components of the exemplary illustrative non-limiting toilet overflow prevention and water conservation device; p

In one exemplary illustrative non-limiting implementation, housing 202 is designed to house various components shown in FIG. 8A while also being supported above the water level in the toilet tank 52. Although not limiting, there may be certain advantages in terms of ease of use and installation if the device 200 sits above the water level and is immediately available to the user as soon as the tank lid is removed. Accordingly, in one exemplary illustrative non-limiting implementation, device housing 202 is made of a water-impervious material such as hard flexible plastic and includes two portions: a supporting/mounting portion 204a and a component housing portion 204b. In the exemplary illustrative non-limiting implementation shown, the supporting/mounting portion 204a is designed to accommodate and be supported by a portion of conventional fill valve 66. The component housing portion 204b contains certain components (e.g., a battery, loaded spring or other electrical or mechanical power source, a water level sensor, and a control circuit or other control mechanism) that conditionally overrides or enhances the normal operation of fill valve 66.

The shape of housing 202 can be any convenient shape that will fit within a conventional toilet tank 52. In the exemplary illustrative non-limiting implementation shown, housing 202 has an almost eye-glass like shape with two portions 204a, 204b being the two lenses. In the example shown, portion 204a is mostly rounded whereas portion 204b is more square, and the two portions are joined by a thinner transitional portion. This particular design allows device 200 to easily fit within the corner of a toilet tank 52, the usual location for fill valves as determined by toilet manufacturers, without getting in the way of other important mechanisms such as the flush handle 56 (see FIG. 6F). However, any convenient and functional shape and/or configuration can be used.

In the exemplary illustrative non-limiting implementation, supporting/mounting portion 204a is at least partially conformal with and/or accepts the outer surface 118a of protective cap 118. Housing portion 204a in this non-limiting implementation conformally snaps onto the protective cap 118 and is supported and retained by the cap.

Figure 6B:
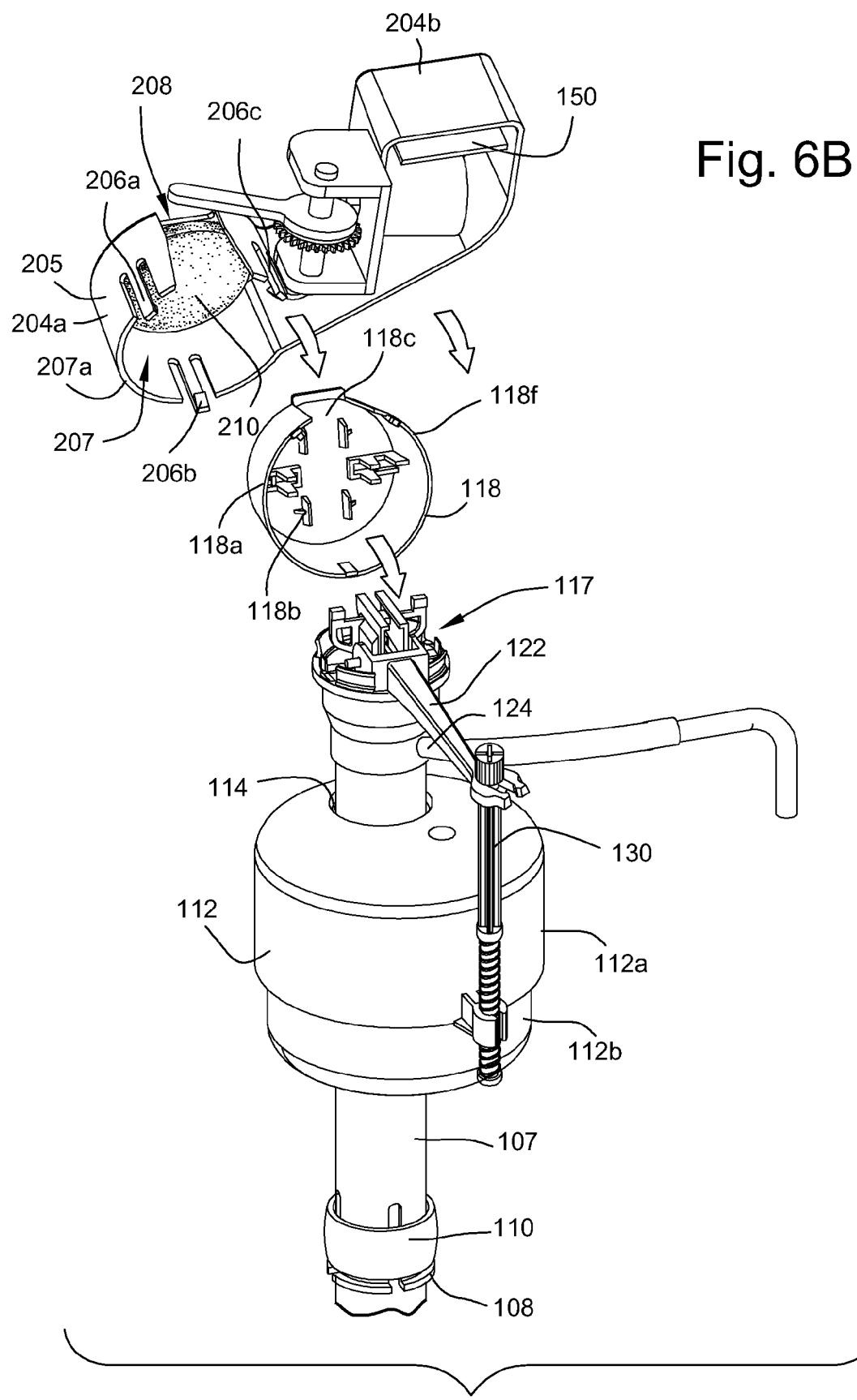
FIG. 6B shows in detail how the non-limiting toilet overflow prevention and water conservation device can be compatibly installed over the prior art fill valve protective cap.

As shown in FIG. 6B, the housing portion 204a in one exemplary implementation defines a cylindrical hollow cavity 207 having a diameter that is slightly larger than the maximum diameter of cap 118. The cap 118 in one exemplary illustrative implementation is tapered, and the hollow cavity may be tapered or may have a substantially uniform diameter. A lower circular lip 207a of housing portion 204a surrounding cavity 207 thus provides a uniform or non-uniform diameter that is substantially conformal with the outside surface of at least the lower portion of protective cap 118 (see FIG. 6C).

In the exemplary illustrative non-limiting implementation shown in FIGS. 6 and 6A, device 200 housing portion 204a can provide one or more protruding retaining fingers 206 that reach over onto and retain the device on fill valve cap 118. The compatible portion 204a is preferably conformal at least in part with the exterior surface 118a of fill valve cap 118. Such a conformal snapping or other attaching arrangement to an existing protective cap 118 provides certain advantages in some applications in terms of ease of installation without any need to modify the fill valve 66.

A slot 208 defined within housing 202 provides a non-obstructing and non-contacting passage for lever 122. Slot 208 may in some implementations have substantially the same dimensions as a slot 118c defined within cap 118 to also allow lever 122 to pass therethrough.

Figure 6C:
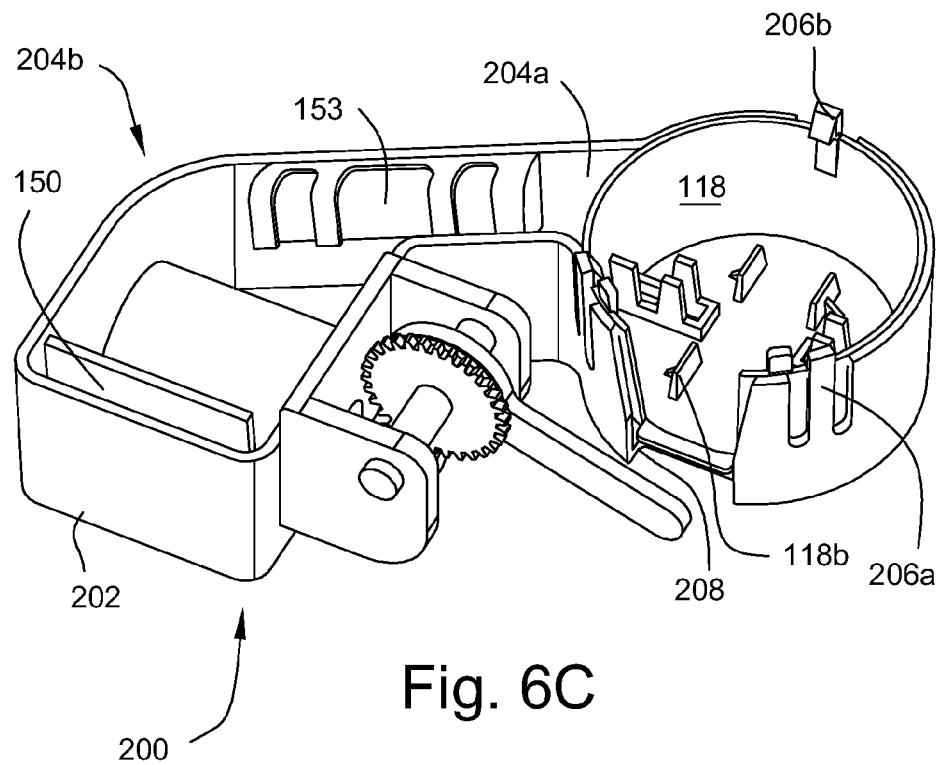
FIG. 6C shows a detail of the prior art fill valve protective cap can be conformally inserted into the housing of the non-limiting toilet overflow prevention and water conservation device.
Figure 6D:
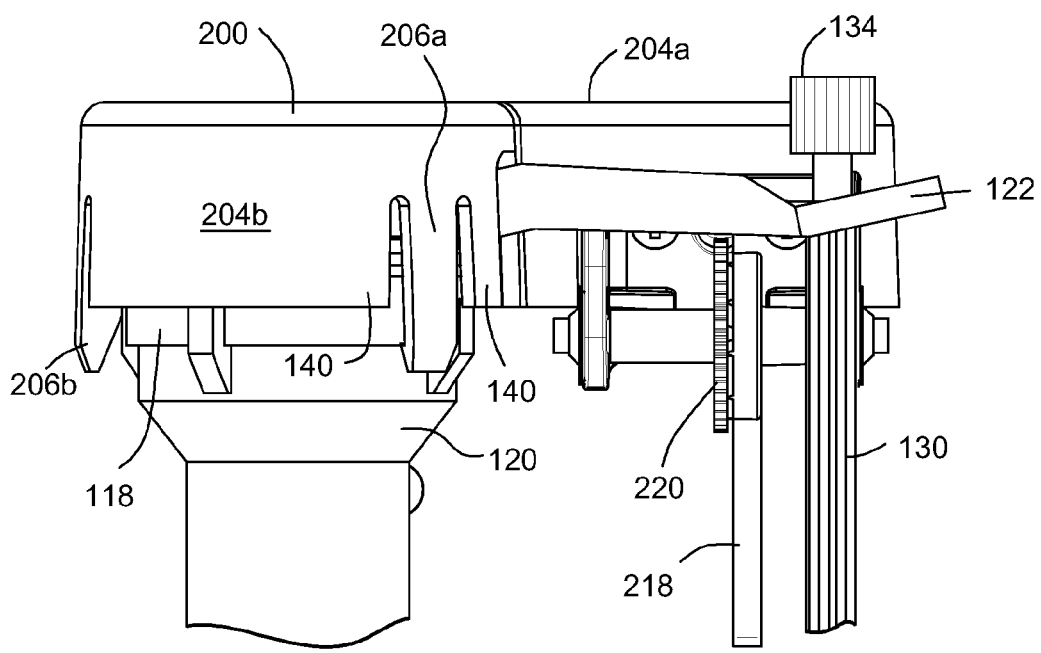
FIG. 6D shows an exemplary illustrative non-limiting toilet overflow and water conservation device mounted to a conventional fill valve and not (yet) interfering with its operation.
Figure 6E:
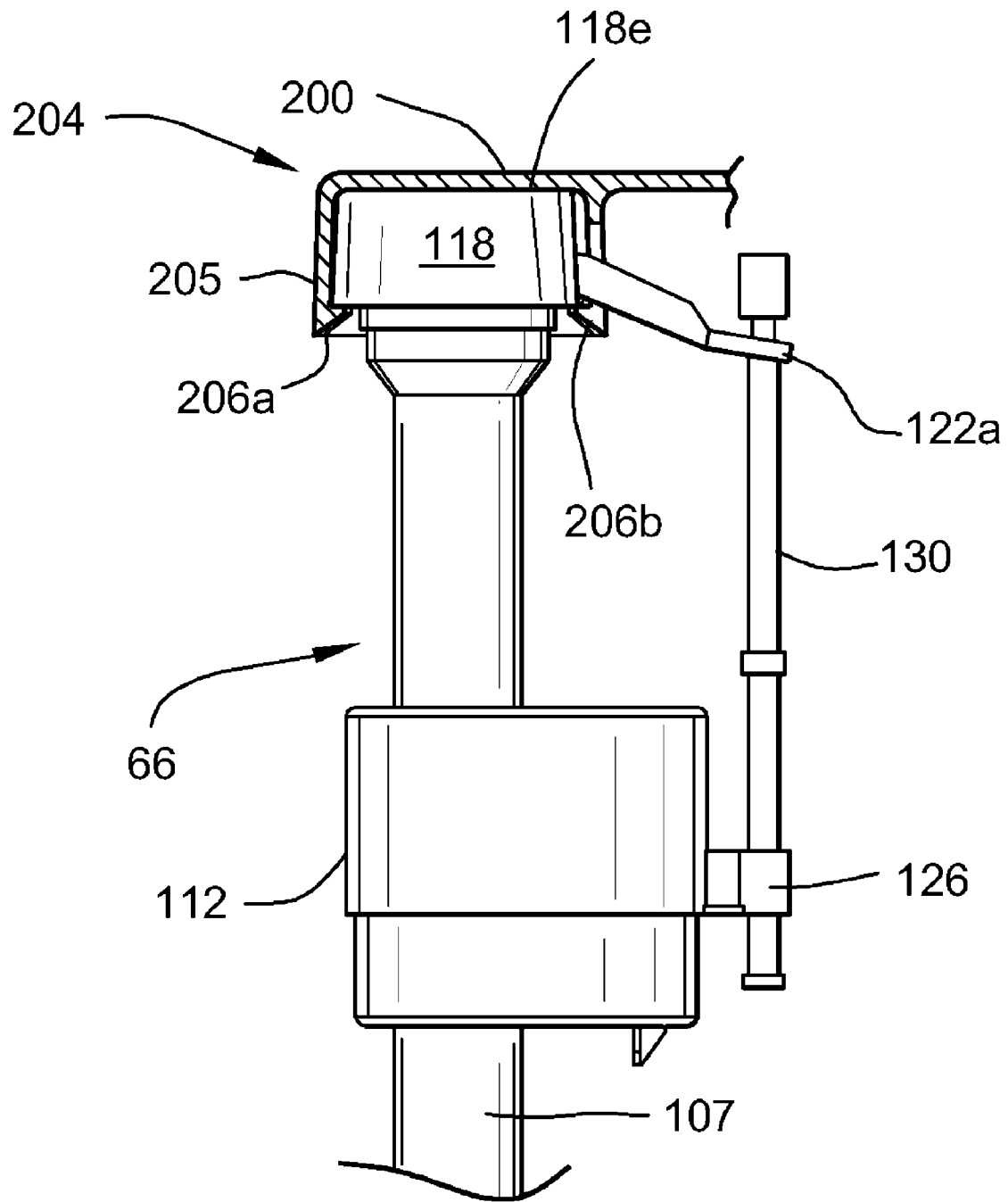
FIG. 6E is an elevated side and cross-section view of the FIG. 6 toilet overflow prevention and water conservation device inserted into and gripping a prior art fill valve protective cap.
Figure 6F:
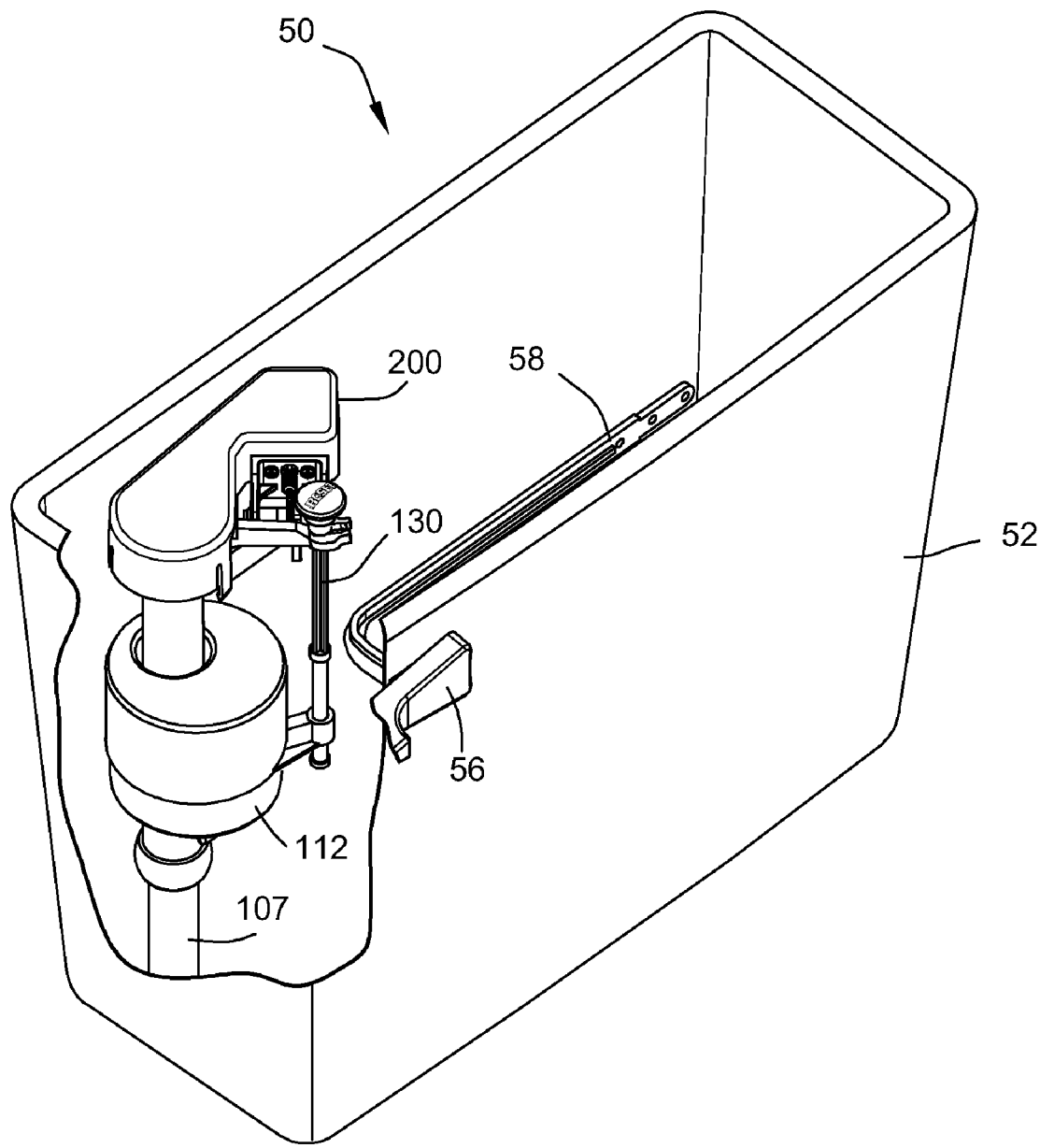
FIG. 6F shows a cutaway view of the FIG. 6 toilet overflow prevention and water conservation device as installed in an exemplary toilet tank.

Placing the housing portion 204a over the cap 118 and applying pressure forces the cap to become inserted into the cavity 207 as shown in FIGS. 6C and 6D. In one exemplary illustrative non-limiting implementation, the housing portion 204a is designed to accept substantially the entirety of cap 118. The top surface 118e of cap 118 (see FIGS. 6A and 6E) may or may not be in contact with housing 202. In some exemplary illustrative non-limiting implementations, a compressible spacer 210 (e.g., adhesive backed foam or other material) may be provided within the cavity 207 to accommodate variations in the dimensions of cap 118.

When cap 118 has been pressed substantially fully into the housing cavity 207, the plurality of gripping fingers 206 extending from the housing 202 snap over and grasp the cap lower lip 118f. These gripping fingers 206 lock the housing 202 in place onto cap 118, thus stabilizing its position relative to the fill valve 66. The user receives tactile feedback in the form of a sensible "snap" when fingers 206 snap over cap 118 and grip the cap's lip 118f.

Gripping of the cap 118 by fingers 206 causes the housing 202 to be anchored to and supported by cap 118 in a substantially horizontal orientation and prevents it from falling into the toilet tank 52 or rotating with respect to the cap, because during installation the fingers 206 tend to mechanically orient and position naturally adjacent to vertical tabs 140 (shown in FIG. 6D) that are integrated into valve body upper portion 120. Assuming that the height of fill valve 66 has already been adjusted properly as described above, the housing 202 can be supported within the tank 52 at a height which does not interfere with the covering of the tank by a tank lid 53 because the top material surface thickness of housing 202 is preferably less than 0.050", adding minimal additional total height to the existing fill valve 66. If the user encounters a clearance problem, the user can adjust the height of fill valve 66 as described above to provide additional clearance as needed.

In the non-limiting examples shown, it is possible to remove housing 201 from cap 118 after installation by applying outward pressure to any of fingers 206. Applying such outward pressure causes the housing 202 to release the cap 118. The housing 202 can be reapplied simply by applying pressure to once again snap fingers 206 over the cap 118 to thereby grip the cap once again.

Example Override Operation of Device 200

Figure 7A:
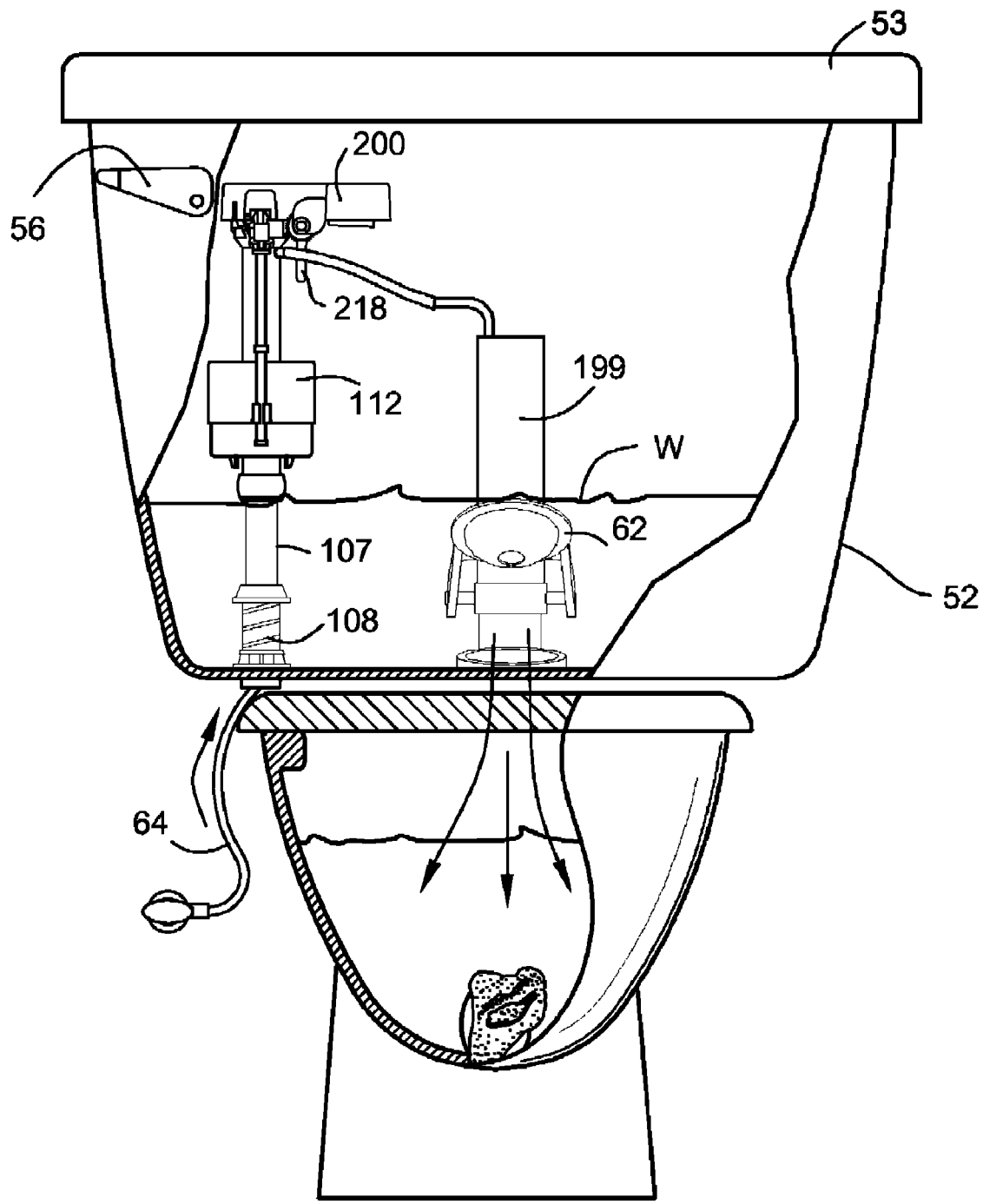
FIG. 7A shows the conventional toilet tank in cutaway view with the toilet overflow prevention and water conservation device operating in a non-interfering mode but with the bowl and tank conditions that require interference with the normal operation of the fill valve.
Figure 7B:
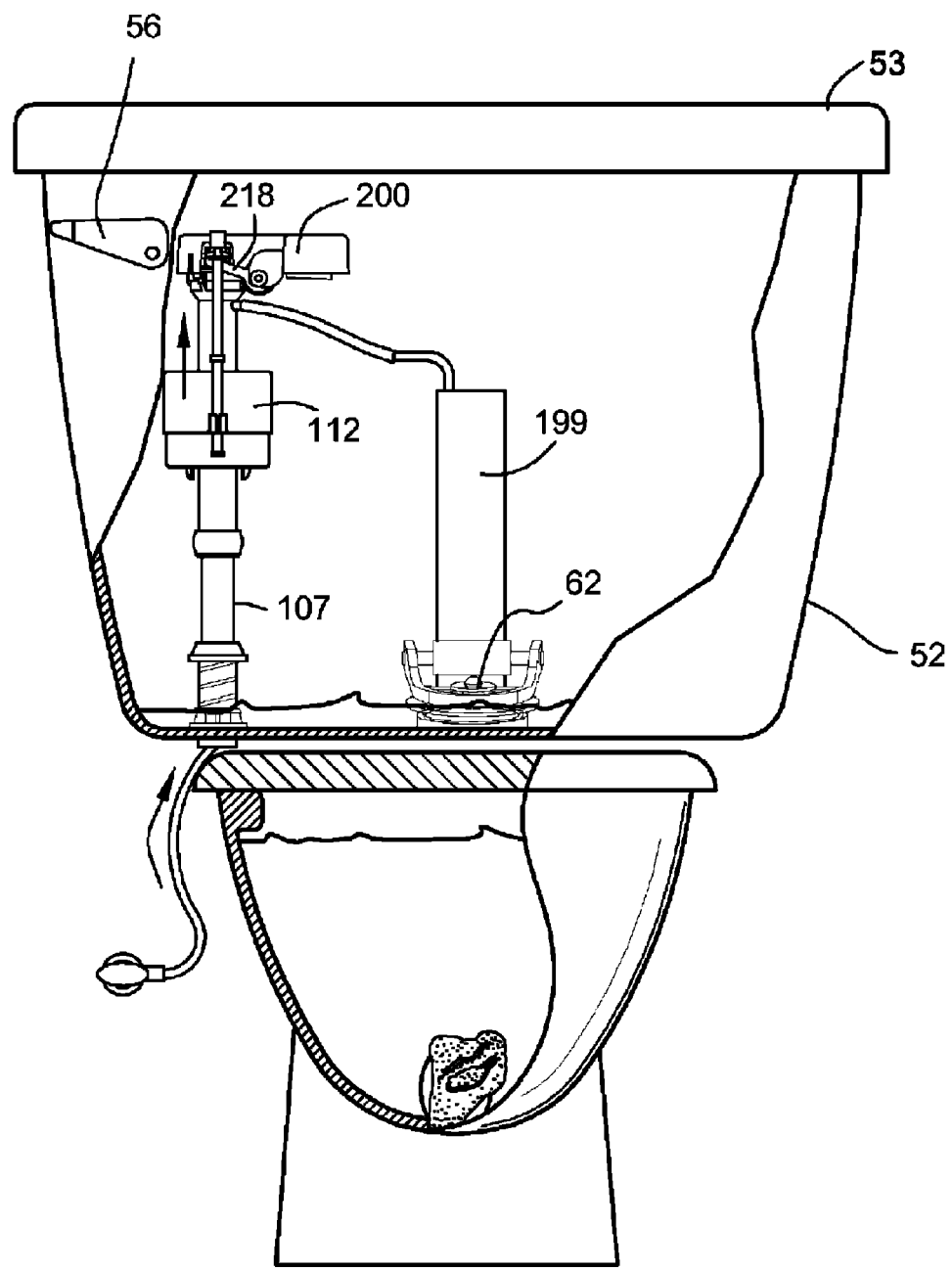
FIG. 7B shows another cutaway view of a conventional toilet tank with the exemplary illustrative non-limiting toilet overflow prevention and water conservation device installed and operating in an interfering mode to reduce or cease further fluid flow.

Toilet overflow prevention and water conservation device 200 in the exemplary illustrative non-limiting implementation shown in FIGS. 6A-6E includes a drive mechanism 216. In this exemplary illustrative non-limiting example, drive mechanism 216 selectively and conditionally drives a member such as an arm 218 to interfere with or override the operation of fill valve lever 122. In one exemplary illustrative non-limiting implementation, the normal position of arm 218 is downward (vertically oriented in the same direction as fill valve rod 130) so that there is no interference. See FIG. 7A. However, in an interfering of "override" mode of operation, device 200 conditionally drives arm 218 upwardly as shown in FIG. 7B. Driving arm 218 upwardly causes the arm to contact and also drive upwardly fill valve lever 122, thereby preventing the fill valve from delivering more water into tank 52.

Figure 7C:
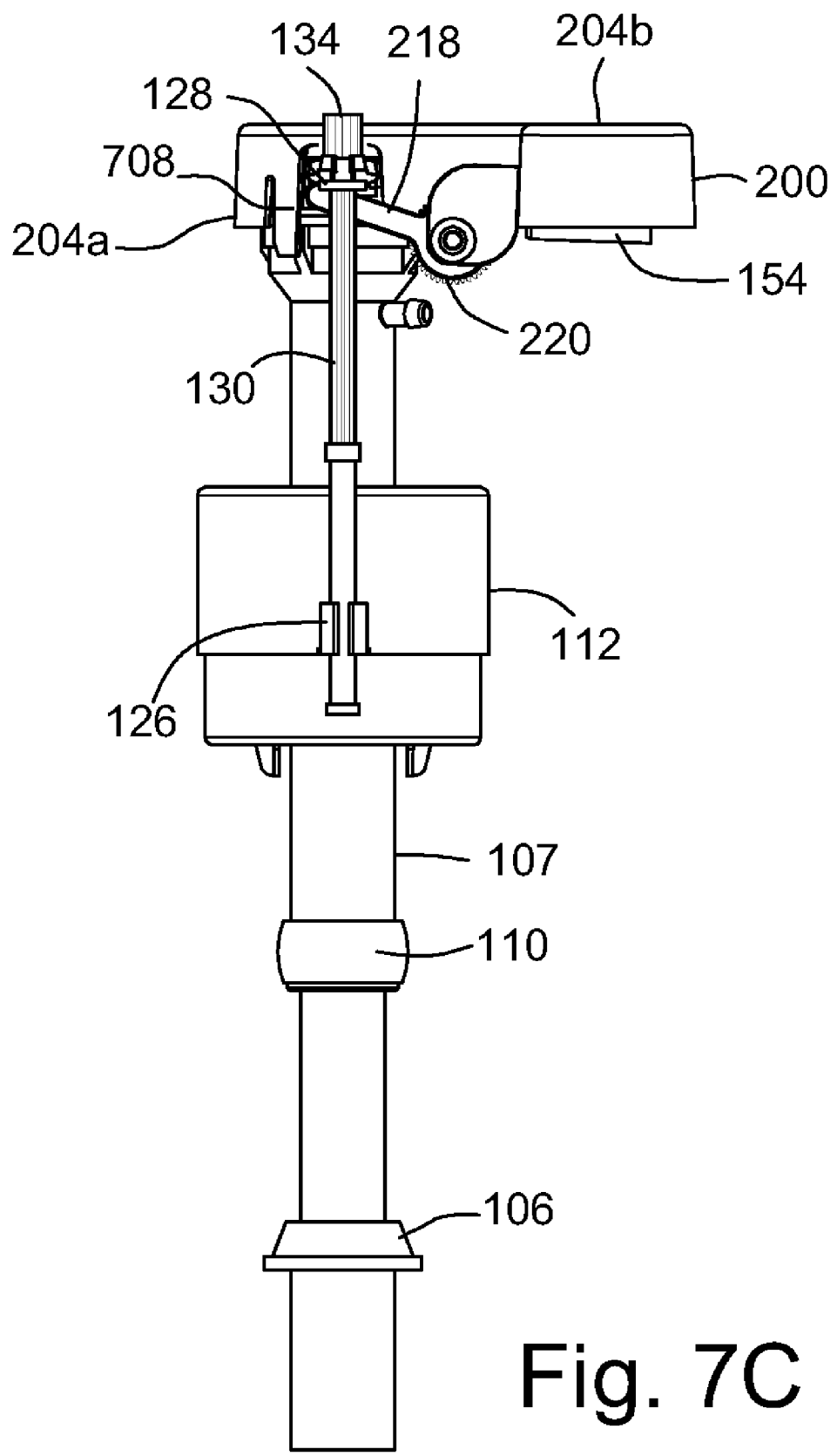
FIG. 7C shows an exemplary illustrative non-limiting toilet overflow and water conservation device mounted on a conventional fill valve and now operating in a mode where it is interfering with or overriding the operation of the fill valve.

Consider a situation where the water level within the toilet tank 52 is sufficiently low to cause float 112 to be at or near its lower position (see FIG. 7B). This means that needle valve 117 will normally allow the flow of water into the tank. When device 200 drives arm 218 upwardly, the arm 208 acts on lever 122 to drive float 112 upwardly against the force of gravity. Device 200 thus interferes with the normal operation of fill valve 66 and causes it to decrease or altogether stop the flow of water through needle valve 117. See more detailed FIG. 7C.

In one exemplary illustrative non-limiting implementation, drive mechanism 216 may include an electrical component such as an electric motor 154. See FIG. 8A block diagram. The electrical motor 154 may operate when it receives electrical current from controller 150. Controller 150 sends electric motor 154 current in response to a water level sensor 152 that senses the water level in tank 52 relative to time. In one exemplary illustrative non-limiting implementation, water level 152 can comprise a capacitive type water sensor constructed of printed circuit board material that includes an exposed electrical plate on one side and an insulated plate on the other side. Such a sensor capacitively measures the water level within tank 52. Other types of water level sensors (e.g., ultrasonic, optical, mechanical/floating, etc.) could be used to measure the level of water within tank 52. Controller 150 determines when to drive motor 154 in response to analyzing the tank 52 water level relative to time, e.g., based on detecting, in response to monitoring tank 52 water level instantaneously and/or with respect to time, when the observed fluid level is inconsistent with what is known to be, or has been learned to be, the normal operation of the toilet. Comparison between the monitored fluid level over time and the expected fluid level over time can be based, for example, on a training or "teach mode" period where device 200 observes and records the fluid level within tank 52 during normal operation of the toilet 50 and then uses this recorded information as a baseline to determine when the toilet begins operating abnormally.

When controller 150 applies current to motor 154, the motor drives arm 218 upwardly to interfere with the operation of lever 122. Other drive mechanisms could be used to drive member 122 including spring-loaded (e.g., key wound) or other mechanical force storage mechanisms, other electrical or electro-mechanical mechanisms, or any convenient controllable mechanism. Any drive mechanism capable of being selectively actuated to force float 112 upward and maintain it at that uppermost position, even when the water within tank 52 does not cause the float to rise upwards due to buoyancy, could be used.

Figure 8B:
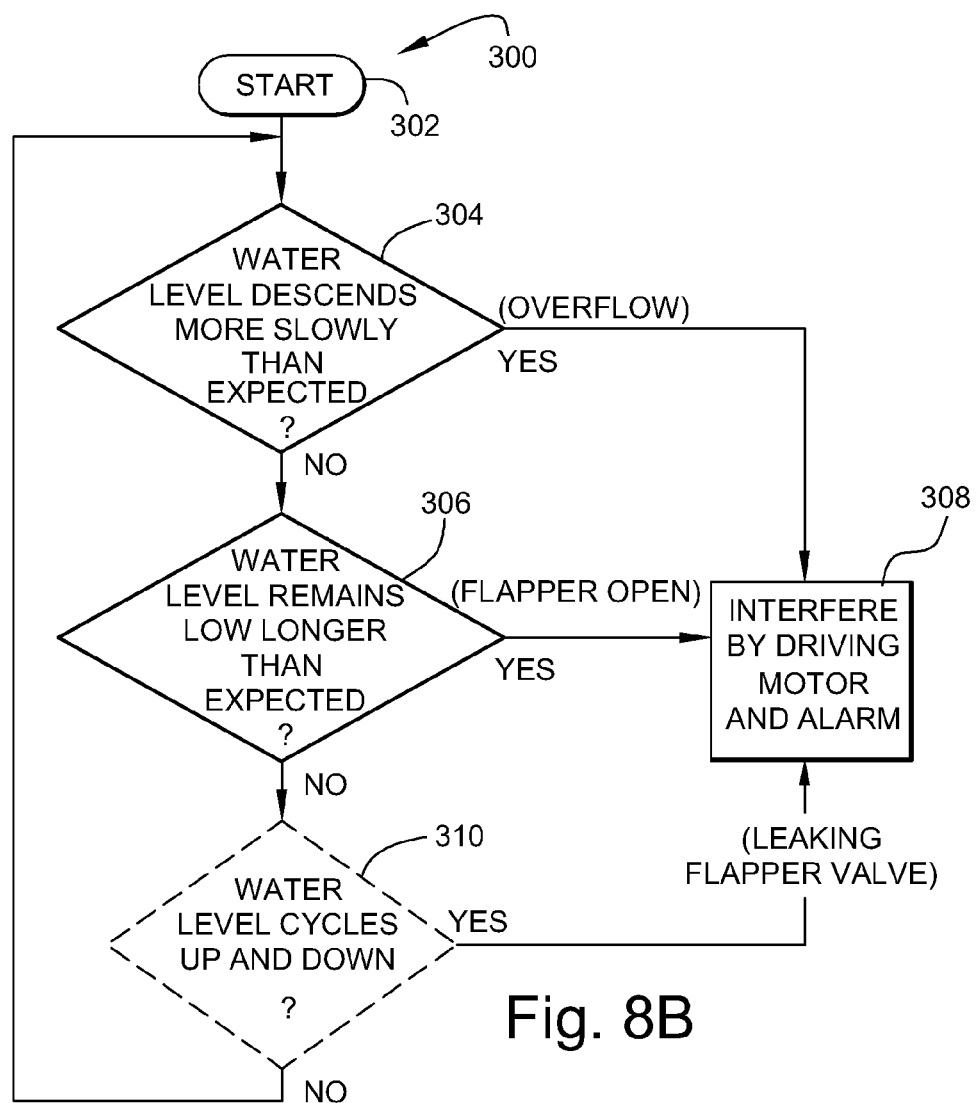
FIG. 8B is a flowchart describing exemplary illustrative non-limiting operational modes of the exemplary illustrative non-limiting toilet overflow prevention and water conservation device.

FIG. 8B shows a flowchart of the operation of controller circuit 150 in an exemplary illustrative non-limiting implementation. In this particular illustrative non-limiting example, controller circuit 150 monitors a water level sensor 152 to determine whether there is a problem with the operation of the toilet. If the controller circuit 150 determines, based on monitoring water level sensor 152 over time (e.g., change in slope of the water height from a known normal operating condition), that the water level within tank 52 descends more slowly than expected (block 304), this detection indicates that the toilet may overflow if another flush is allowed. If the controller circuit 150 in response to the water level sensor 152 determines that the water level within tank 52 remains at a low level longer than expected (decision block 306), this may indicate that the flapper 62 may be stuck in an open position or unable to close due to an obstruction preventing bowl 54 to drain. This can cause the fill valve to remain open, allowing water to continue to be admitted into tank 52 and continuously flow into bowl 54. If the controller circuit 150 determines, in response to detected water level within tank 52, that the water level repeatedly cycles up and down over time (decision block 310), this may indicate that the flapper 62 is leaking. In any of these conditions, controller circuit 150 can drive motor 154 to cause device 200 to interfere with the normal operation of fill valve 66 (block 308).

The conditions shown are exemplary and illustrative but are by no means limitations. Other or different conditions may be detected depending upon the application.

When device 200 begins operating in a mode that interferes with the operation of fill valve 66, it may be desirable to notify the end user such as by generating an audible and/or visible alarm. An alarm advises the user that device 200 is actively preventing the toilet from flushing again and/or is restricting water inflow due to a toilet malfunction, and alerts the user to the need to take corrective action. The appropriate corrective action may depend upon the nature of the particular problem that was detected. For example, if the toilet is clogged, the user could clear the obstruction. If the flapper 62 is leaking or open, the user could close or replace the flapper. The alarm can be tone modulated or pulsed to indicate what kind of problem has been detected, if desired.

Example Reset Feature

Once the problem has been corrected, the device 200 can be reset. In one exemplary illustrative non-limiting implementation, the user resets device 200 manually (e.g., by pressing a reset button or otherwise operating a manual reset mechanism) once the user has corrected the problem. It is also possible to have the device 200 reset automatically. Device 200 can also, if desired, automatically determine if and when the problem has been corrected and reset if/when the problem has been corrected. The reset feature can be implemented using any of several different mechanical and/or electrical forms. It may be manually actuated or automatically actuated, depending on the application. Other designs may not need or use a reset feature, depending on requirements.

In one exemplary illustrative non-limiting implementation, a reset mechanism can be provided by a simple momentary-on button that the user depresses once the user has corrected the problem with the toilet. Such a momentary-on button can be disposed on housing 200 (to make it easily accessible by opening the toilet tank). It could be located elsewhere (e.g., on a remote control device external to the toilet tank). Depressing the reset button causes the drive motor 154 to reverse its direction and begin driving arm 218 downwardly into a non-interfering position. Device 200 may then detect whether the problem has been corrected. If the problem has not been corrected, device 200 can once again apply current to the drive motor 154 to once again raise arm 218 into an interfering position.

Exemplary Illustrative Non-Limiting Alternative Mounting Arrangements

Figure 9A:
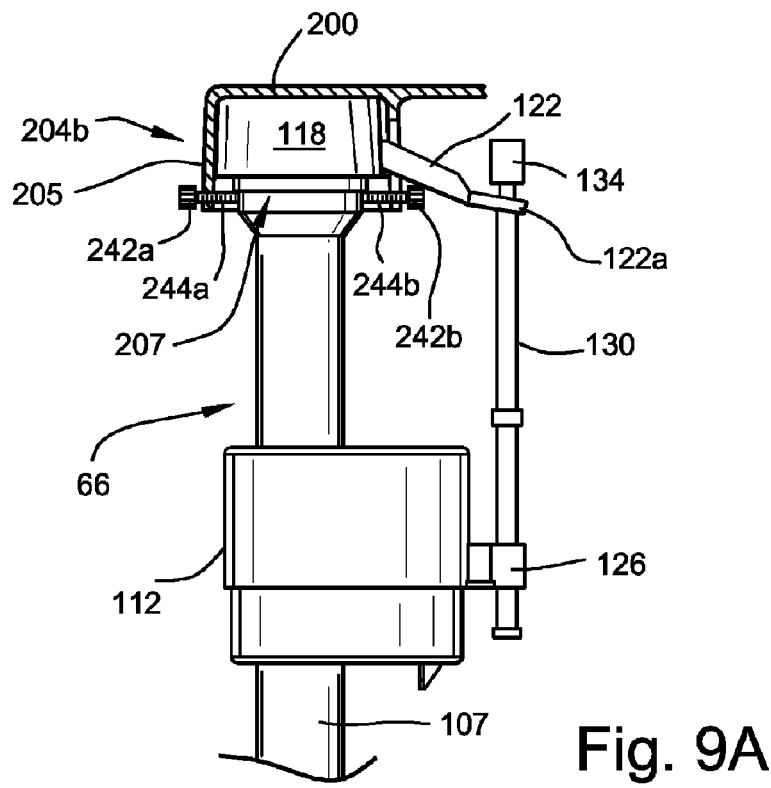
FIG. 9A shows an additional exemplary illustrative non-limiting implementation of an toilet overflow prevention and water conservation device mounting arrangement using set screws for mounting.

FIGS. 9A-9F show alternative exemplary illustrative non-limiting mounting arrangements for mounting and supporting device 200 on conventional fill valve 66. FIG. 9A shows an arrangement wherein the fingers 206a, 206b, 206c (as shown in FIG. 6b) are replaced with set screws 242a, 242b. These set screws 242 can comprise conventional threaded plastic set screws that screw into and are retained by threaded holes 244 in the wall 205 of housing portion 204a. To install the arrangement shown in FIG. 9A, the user inserts protective cap 118 into the cylindrical or tapered cavity 207 and rotates set screws 242 clockwise to tighten them against the valve body upper portion 120.

Figure 9B:
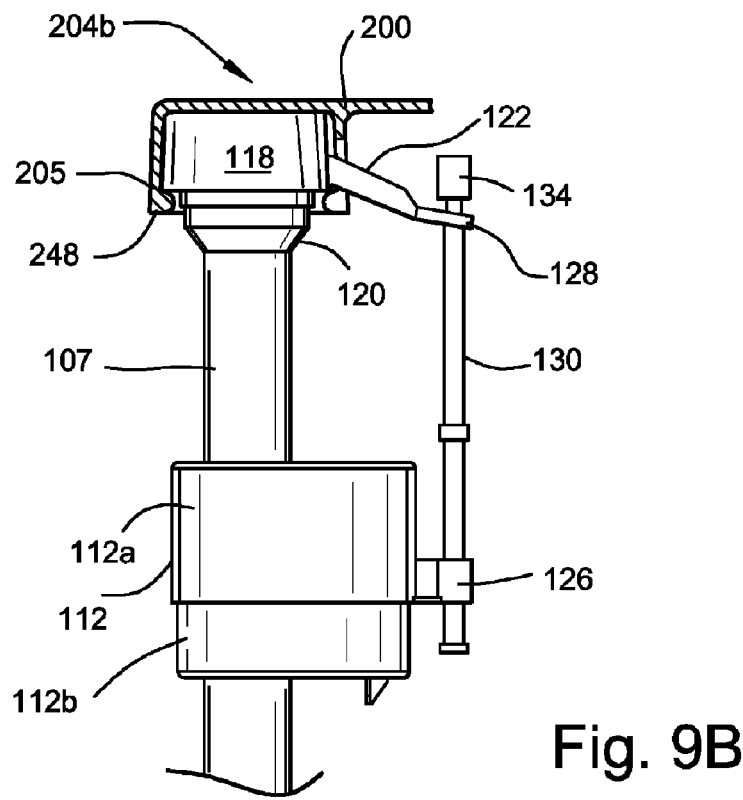
FIG. 9B shows yet another toilet overflow prevention and water conservation device exemplary illustrative non-limiting mounting arrangement using a snap ring type mounting structure.

FIG. 9B shows an additional alternative mounting arrangement wherein the tapered or cylindrical walls 205 of housing portion 204a terminate in inwardly-directly projection ring 248. This ring 248 may be an open ring that leaves an opening for lever 122 to pass as the device 200 is installed onto protective cap 118. Ring 248 may be composed of a somewhat flexible plastic or other material that snaps over the lip of protective cap 118 to be retained by the cap.

Figure 9C:
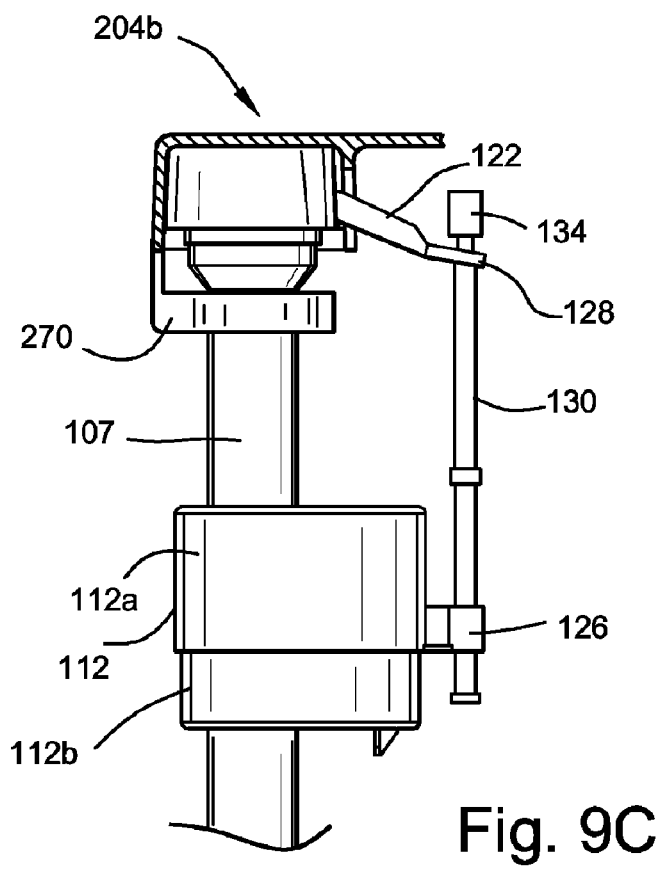
FIG. 9C shows yet an additional exemplary illustrative non-limiting mounting toilet overflow prevention and water conservation device mounting arrangement using a shaft-engaging ring.
Figure 9D:
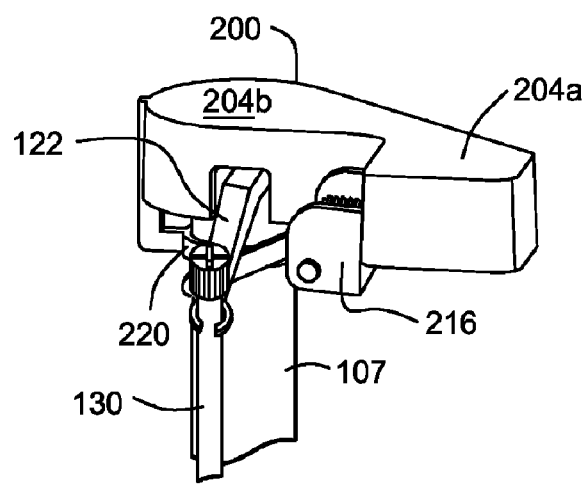
FIG. 9D shows yet another exemplary illustrative non-limiting toilet overflow prevention and water conservation device mounting arrangement using a snap ring for mounting.

FIGS. 9C & 9D show an additional exemplary non-limiting mounting arrangement wherein housing portion 204a is provided with an additional retaining ring 270 that snaps over shank 107 and provides stability and some degree of gripping for retaining the housing portion 204a on fill valve 66. FIG. 9D shows an additional view of the exemplary arrangement shown in FIG. 9C.

Figure 9E:
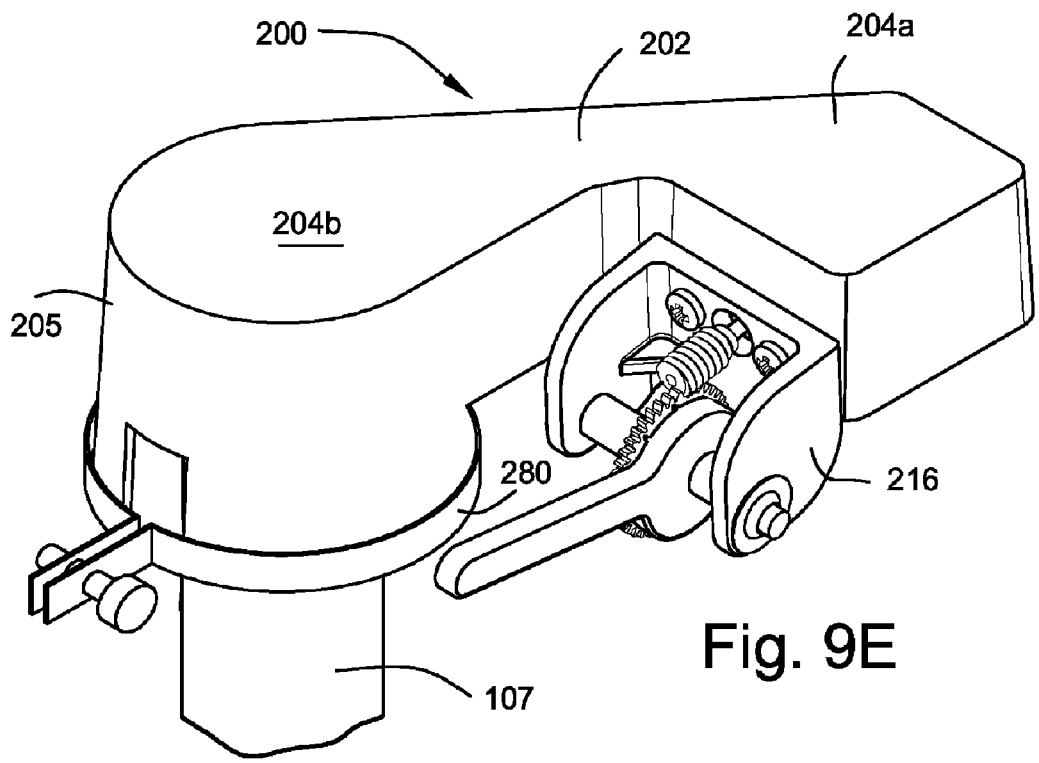
FIG. 9E shows an elevated perspective view of a further exemplary illustrative non-limiting toilet overflow prevention and water conservation device mounting arrangement using a retaining ring.

FIG. 9E shows a still alternative implementation that uses a retaining clamp 280 of conventional design to tighten the wall 205 of housing portion 204a around protective cap 118.

Figure 9F:
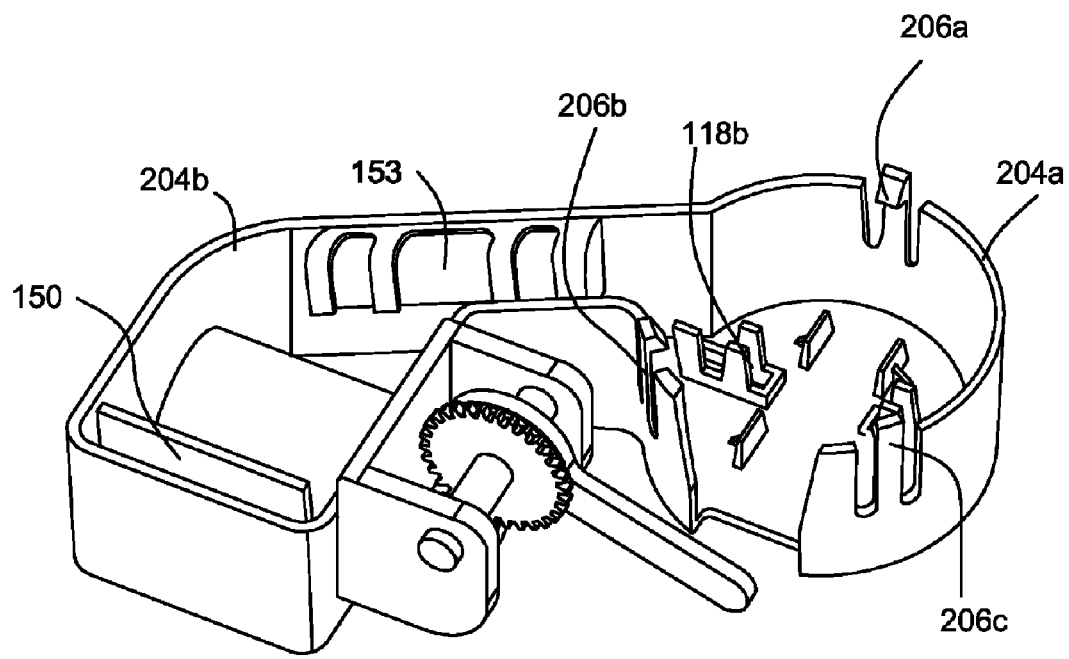
FIG. 9F shows an exemplary illustrative non-limiting toilet outflow prevention and water conservation device having an integral to a conventional fill valve protective cap design so that the device replaces the protective cap.
Figure 9G:
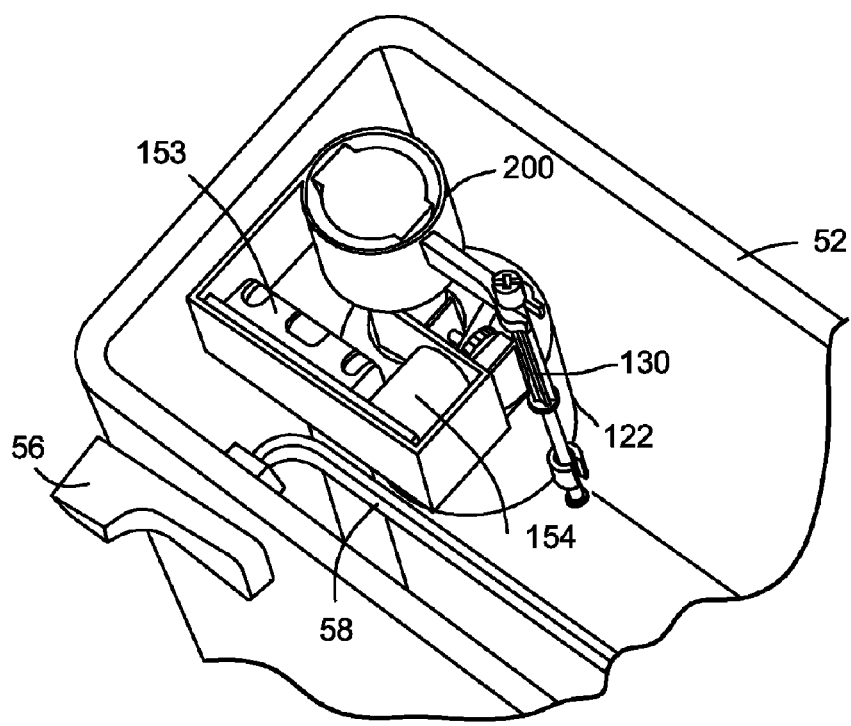
FIG. 9G shows a perspective view of an additional exemplary illustrative non-limiting toilet overflow prevention and water conservation device with an alternative mounting mechanism.

In another exemplary illustrative non-limiting implementation shown in FIG. 9F, protective cap 118 may be removed and replaced with the toilet overflow prevention and water conservation device 200. Although there are certain potential advantages in certain situations to not requiring an end user to remove cap 118 but instead to simply snap toilet overflow prevention and water conservation device 200 onto the outside of the existing protective cap, in other contexts it may be desirable to replace cap 118 with housing 202 to more integrally include the overflow prevent and water conservation functions (e.g., at time of fill valve manufacture, before initial installation, etc.). In such implementations, as shown for example in FIG. 9F, device 200 portion 202 includes a facsimile of at least the portions of protective cap 118 that interface with the valve 66, namely projections 118b that snap onto tabs and tabs that provide alignment with rails 118b of needle valve 117.

Other attaching techniques could be used. For example, a super-adhesive double backed tape, glue or other type of fastening mechanism could be used to anchor, in a waterproof way, housing 200 onto cap 118. In other exemplary implementations, portions of the material of housing 202 could be cut away or not formed, thereby reducing the amount of material in conformal contact with cap 118. Other variations are possible.

In still other implementations, a part of fill valve 66 other than the protective cap 118 can be used as the point of attachment and anchoring for device 200. For example, it is possible to attach or anchor to the fill valve neck, the base or some other substantially stationary or non-stationary portion of the fill valve, to the wall of toilet tank 52 (e.g., by using a hanger or other such mechanism), or to the bottom of the tank. One example could provide a device 200 that is sufficiently lightweight so it could be attached to fill valve float 112.

In still other contexts, it might be desirable to more significantly modify the design of fill valve 66 to for example use a modified or different water fill valve design to provide additional direct control over water flow. In still other applications, the device 200 could act directly on some other part of the toilet (e.g., flapper 62 or handle 56 linkage 60) to conditionally prevent a further flush.

Exemplary Illustrative Non-Limiting Drive Mechanisms

Figure 10:
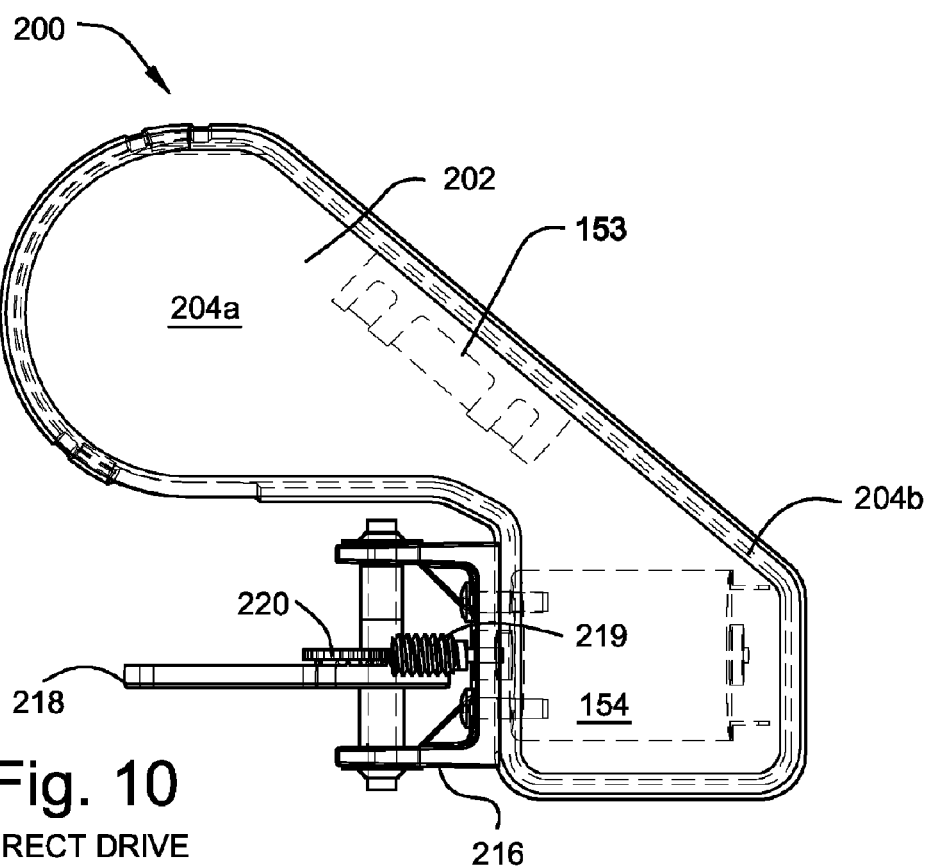
FIG. 10 is a more detailed elevated perspective view of the exemplary illustrative non-limiting toilet overflow prevention and water conservation device including a direct drive mechanism.
Figure 11A:
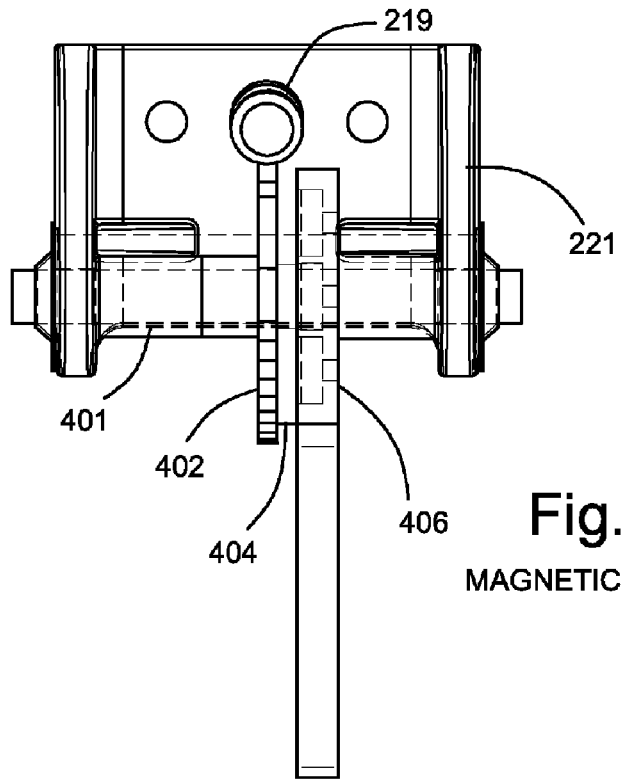
FIG. 11A is a front elevated view of an exemplary illustrative non-limiting magnetic clutch drive mechanism.
Figure 11B:
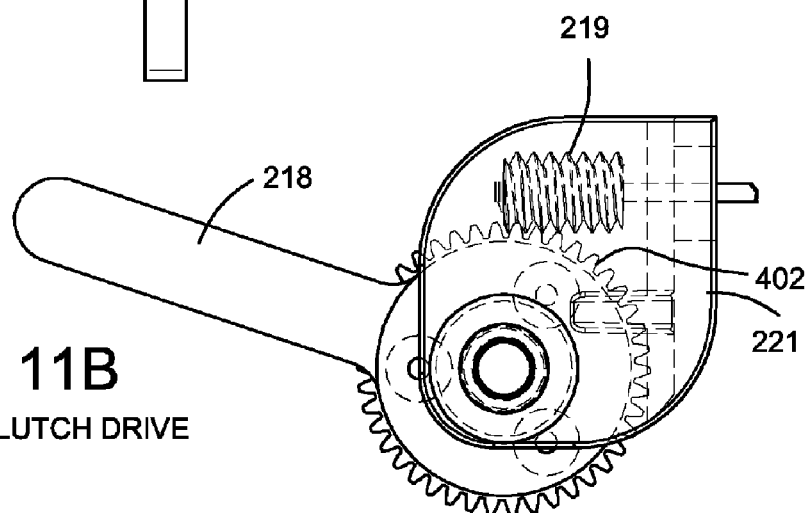
FIG. 11B shows a side elevated view of the exemplary illustrative non-limiting magnetic clutch drive mechanism.
Figure 11C:
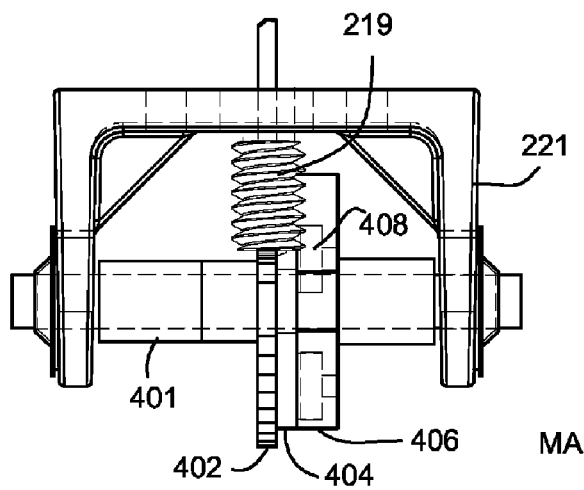
FIG. 11C is a rear elevated view of an exemplary illustrative non-limiting magnetic clutch drive mechanism.
Figure 11D:
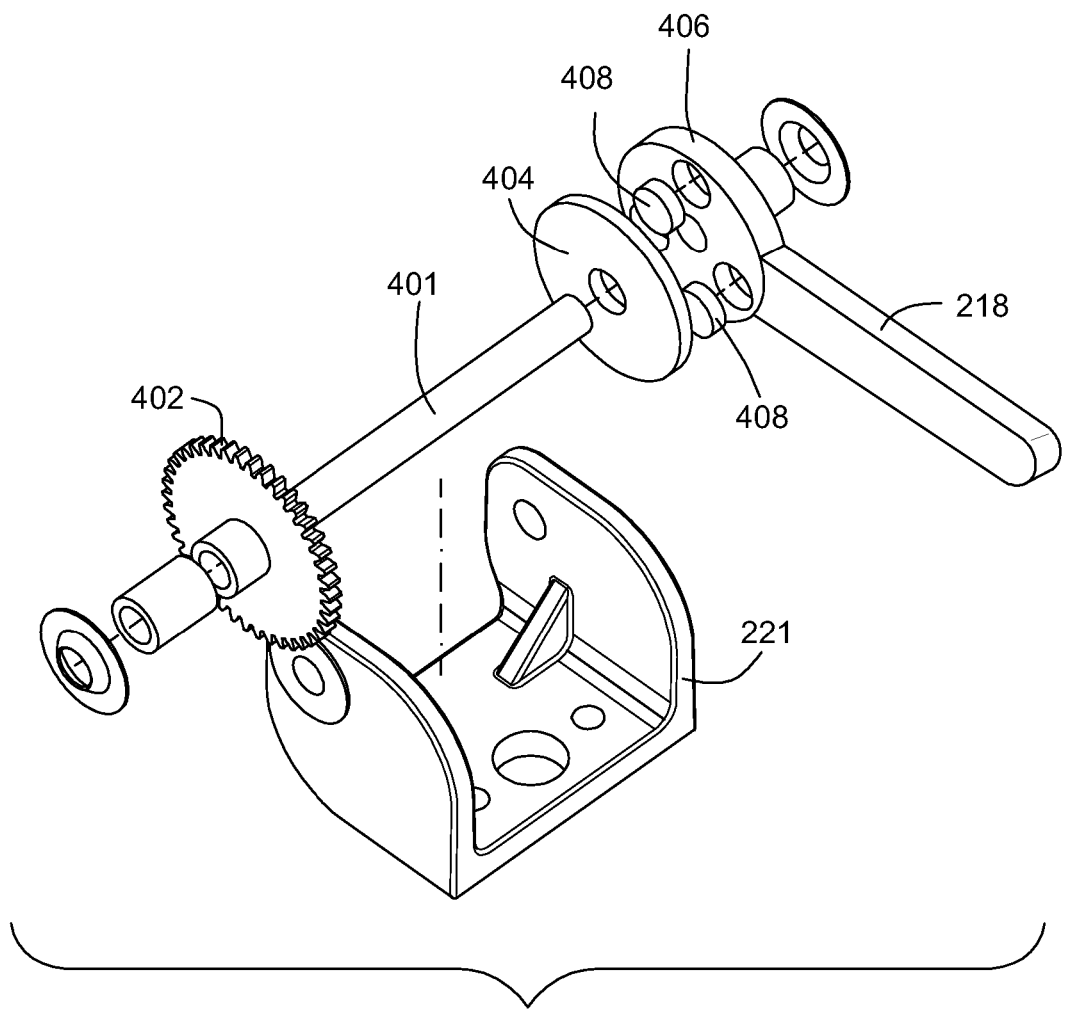
FIG. 11D is an exploded elevated perspective view of the exemplary illustrative non-limiting magnetic clutch drive mechanism.
Figure 12A:
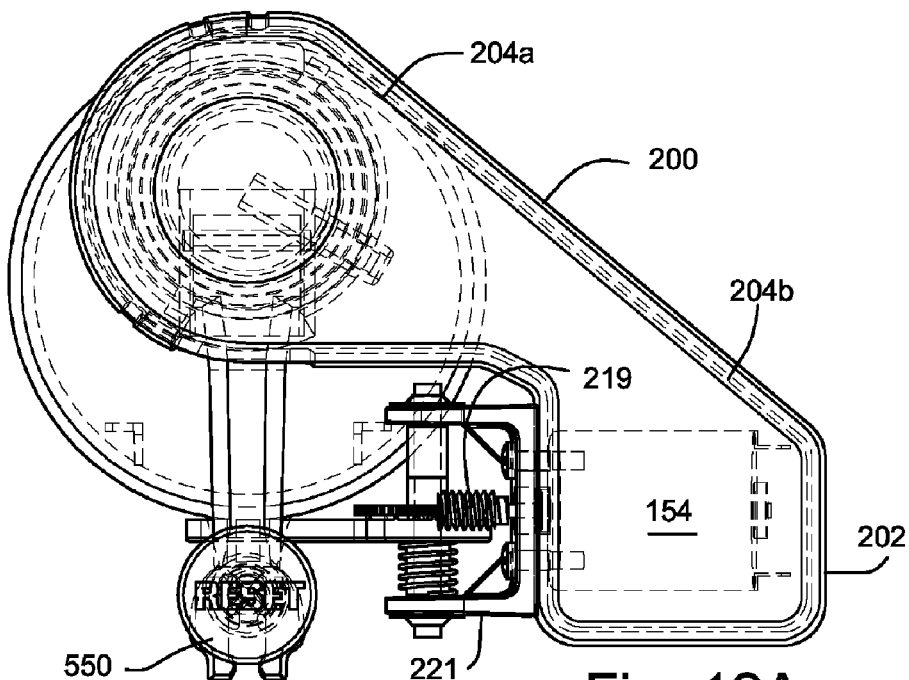
FIG. 12A is a top view in plan of the exemplary illustrative non-limiting conventional toilet overflow prevention and water conservation device using a tooth clutch drive assembly.
Figure 12B:
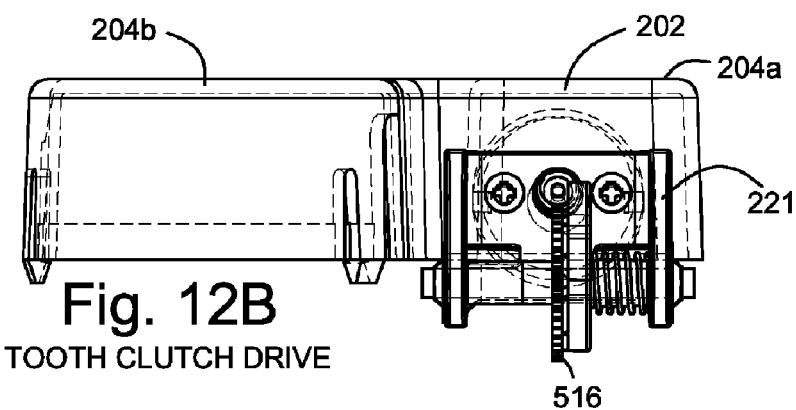
FIG. 12B is a side perspective view of the exemplary illustrative non-limiting toilet overflow prevention and water conservation device using a tooth clutch drive assembly.
Figure 12C:
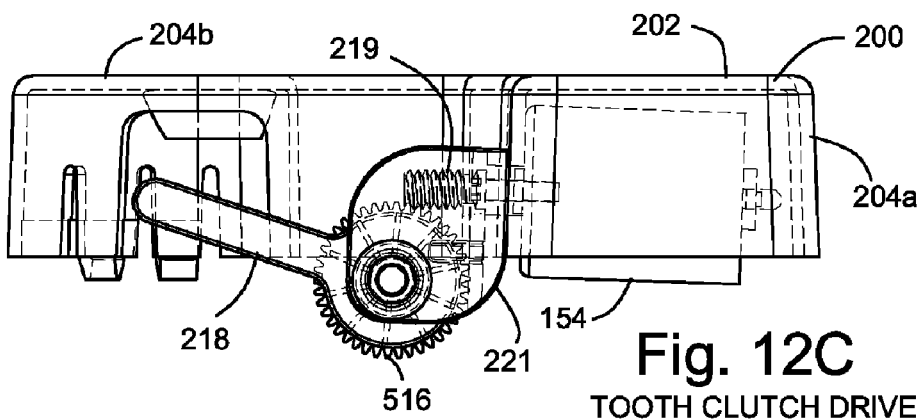
FIG. 12C shows a side elevated view of the exemplary illustrative non-limiting toilet overflow prevention and water conservation device using a tooth clutch drive assembly.
Figure 12D:
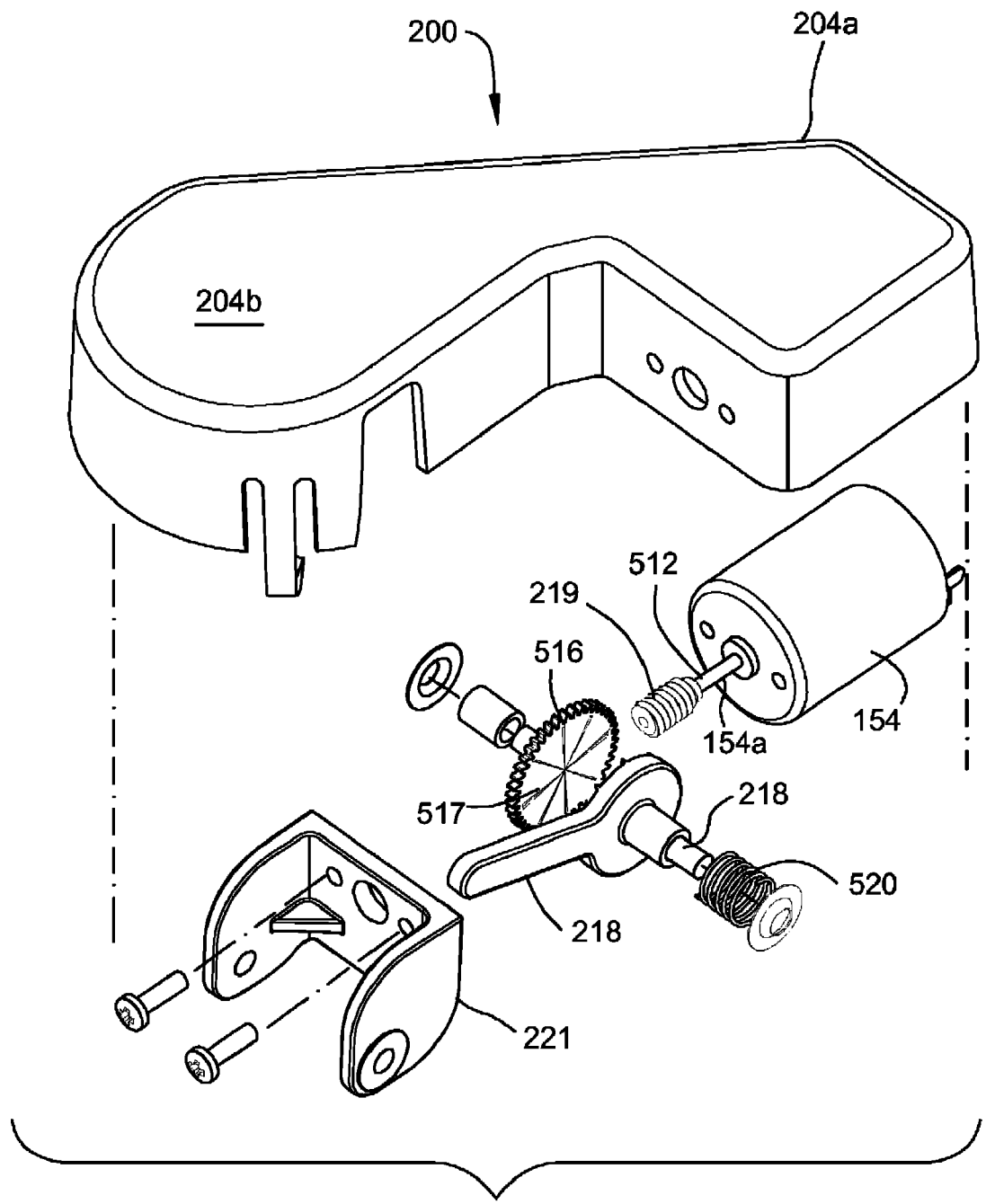
FIG. 12D is an exploded view of an exemplary illustrative non-limiting toilet overflow prevention and water conservation device using a tooth clutch drive assembly.
Figure 12E:
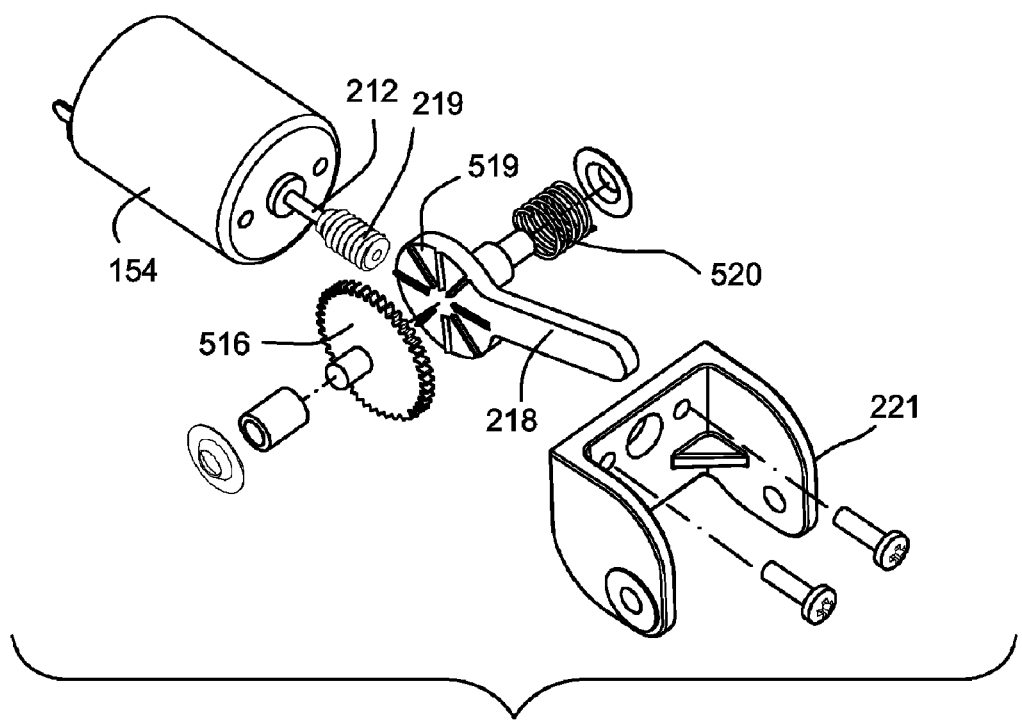
FIG. 12E shows an exploded view of an exemplary tooth clutch drive assembly.

As shown in FIG. 10, one exemplary illustrative non-limiting implementation of drive 216 comprises a non-slip direct drive with a worm gear 219 on the shaft of motor 216. The worm gear 219 engages with a rotary gear 220 that is attached to rotate with the arm 218. When the motor shaft worm gear 219 rotates in a counterclockwise (driven) direction, the worm gear 219 causes the engaged rotary gear 220 to also turn counterclockwise. Counterclockwise rotation of rotary gear 220 causes arm 218 to rotate from a non-interfering (downward vertical) position to an interfering (upward horizontal or above-horizontal) position. When the worm gear 219 is stationary, it serves as a brake to prevent the engaged rotary gear 220 from turning—thereby retaining arm 218 in its current position (interfering or non-interfering). The braking action provided by the worm gear 219 engaged with the rotary gear 220 provides sufficient upward force on lever 122 to resist the downward force that gravity applies to float 122.

Another suitable motor-driven drive mechanism could comprise, for example, a magnetic clutch drive assembly of the type shown in FIGS. 11A-11D. This drive mechanism includes a rotary gear 402 rigidly fixed to the motor shaft 401 with an attached or integral disk 404 of iron or other ferromagnetic material. Arm 218 may be attached to a disk 406 that freely rotates about the same shaft 401. The disk 406 has magnetic material embedded in it. The magnets 408 are attracted to the ferromagnetic disk 404, producing friction between the rotary gear 402 and the freely rotating disk 406. When the motor 154 is driven, it turns the rotary gear 402 and freely rotating disk 406 together until the torque the motor applies exceeds the friction between the ferromagnetic disk 404 and the magnets 408. At that point, the arm 218 has lifted the float lever 122 to prevent further water inflow. When the float lever 122 reaches its maximum upward position and can go no further, the resulting torque overcomes the magnetic attraction and motor 154 is permitted to turn the gear 402 which is now slipping relative to, but still magnetically coupled to, the disk 406 having magnets embedded therein. When the motor 154 stops, the downward force applied to lever 122 by the force of gravity acting on the float is less than the frictive force between the ferromagnetic disk 404 and the disk 406. That frictive force keeps arm 218 in a raised horizontal position to interfere with the operation of fill valve 66. To reset this mechanism, it is possible to reverse the direction of rotation of the drive motor 154 or it is also possible to manually push arm 218 downward to a vertical (non-obstructing) position.

Another suitable motor-driven drive mechanism could comprise a friction/tooth clutch assembly where opposing plates have ridges and indentations which cause the rotation to stop once the force of the engaged plates exceeds the torque applied to the arm. This arrangement is shown in FIGS. 12A-12E.

The tooth clutch drive shown in FIGS. 12A-12E uses a toothed wheel 516 to engage the worm gear 219 on the motor 154's shaft. The gear 516 includes toothed gripping portions 517 that engage similar gripping portions 519 on the member 218 as shown in FIG. 21E. As motor 154 shaft 154a rotates in engagement with gear 516, the segmented surface of 517 of the gear 516 contacts and engages with member segmented surface 519 and causes the member 218 to rotate upwardly. Spring 520 (see FIG. 12E) presses member 218 toward gear 516 to maintain engagement. Reset control 550 such as a manually actuated button may be provided in this drive mechanism to control reversing the direction of motor 154 rotation.

Alternative Exemplary Illustrative Alternative Interfering Mechanisms

Figure 13:
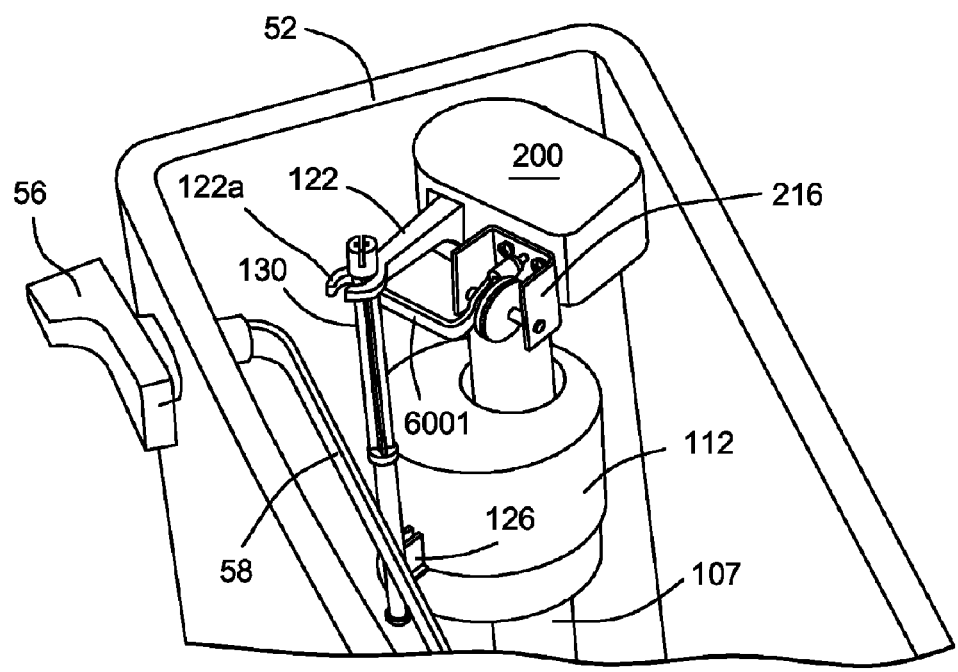
FIG. 13 shows a portion of a conventional toilet tank in cutaway with an exemplary illustrative non-limiting toilet overflow prevention and water conservation device implementation using a right-angle bent interference member.

FIG. 13 shows an alternative exemplary illustrative non-limiting implementation wherein the device 200 drive mechanism 216 drives a non-linearly-shaped (e.g., right angle bent) member 6001. The arcuate shape of member 6001 allows the drive mechanism 216 to be offset in position relative to the fill valve lever 122.

Figure 14:
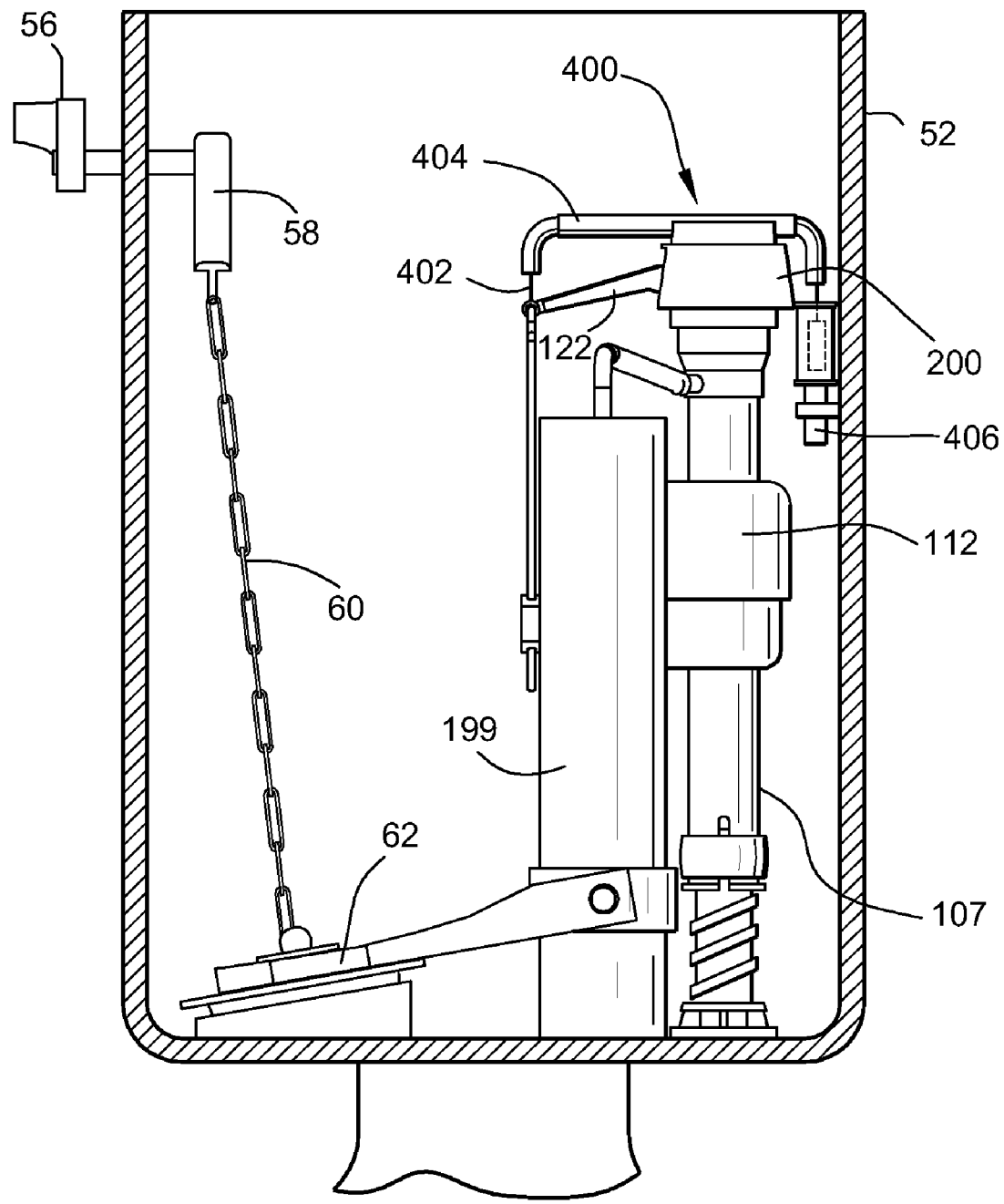
FIG. 14 illustrates a conventional toilet tank in cutaway view showing an exemplary illustrative non-limiting toilet overflow prevention and water conservation device with a cable-based interference mechanism.

FIG. 14 shows an alternative exemplary illustrative non-limiting implementation that uses a different interfering mechanism to interfere with the operation of the fill valve 66. Just as in the other implementation, the interfering device 400 shown in FIG. 14 fits conformally onto the fill valve cap. In this case, however, a cable or wire 402 is coupled to the knurled knob 134 of fill valve pin 130. The cable 402 is capable of selectively exerting an upward pulling force to raise lever 122. In this exemplary illustrative non-limiting implementation, the cable 402 travels through a bended tube 404 and is connected on another end to a counterweight 406. The pull of gravity on counterweight 406 may be used to apply tension to cable 402 and exert an upward pull on lever 122. Counterweight 406 could alternatively be a solenoid or motor drive, actuated by an electrical current.

Figure 15:
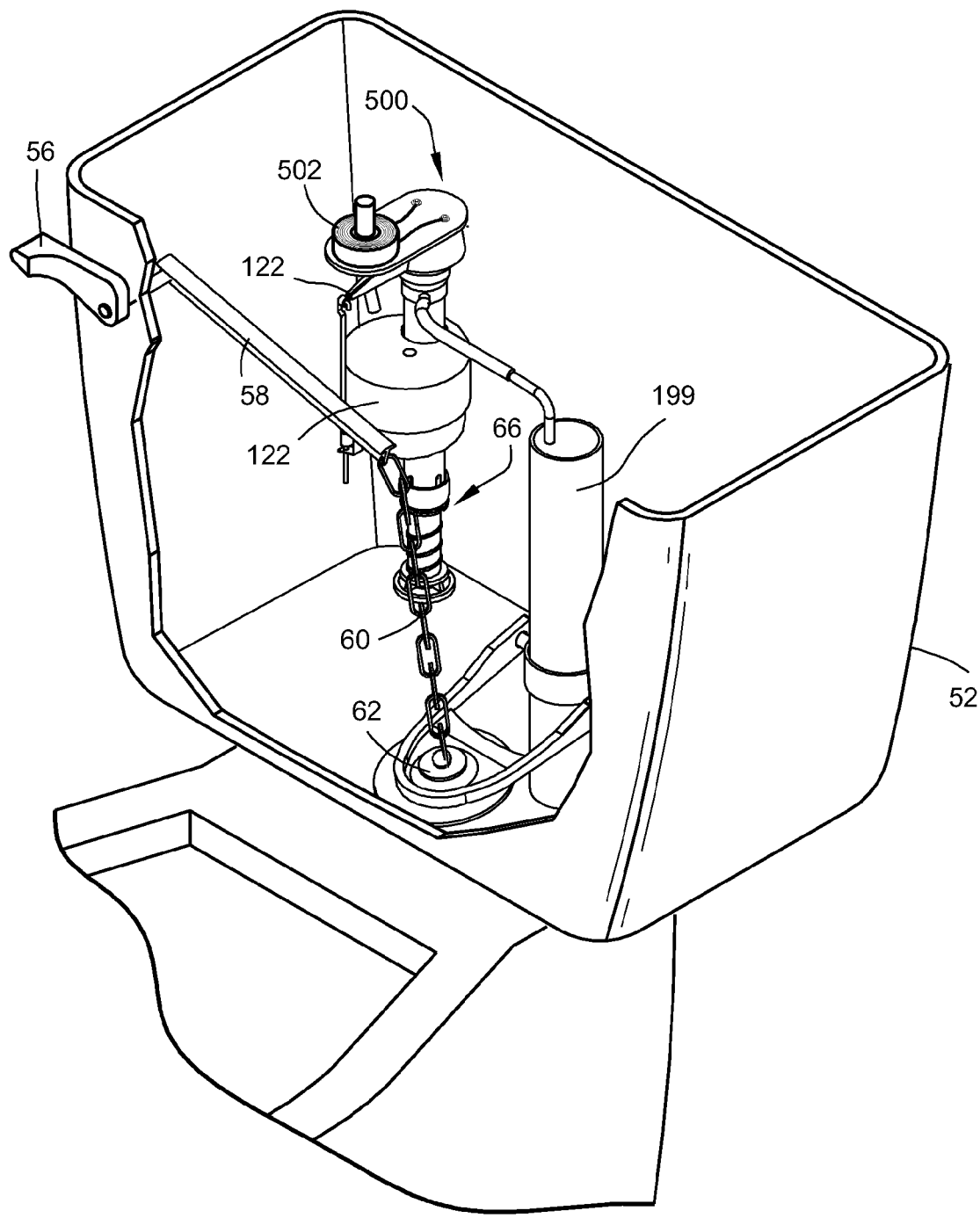
FIG. 15 shows a toilet tank in cutaway perspective view of an exemplary illustrative non-limiting toilet overflow prevention and water conservation device implementation using a solenoid-based interference mechanism.

FIG. 15 shows yet another exemplary illustrative non-limiting implementation of an interfering device 500 based on a solenoid 502. Solenoid 502 may be used to produce a strong electromagnetic field which can act on a ferromagnetic element attached to or provided as part of arm 122. When power is applied to solenoid 502, the electromagnetic field that it generates applies a magnetic pulling force upwardly onto arm 122 to thereby interfere with the operation of fill valve 66. Those skilled in the art will recognize that solenoid 502 can be of the mechanically latching type, eliminating the need for continuous electric current to supply power in order to maintain the uppermost extension of lever 122 should solenoid 502 be mechanically attached to lever 122.

Exemplary Illustrative Hydraulic-Based Override Mechanism

Figure 16A:
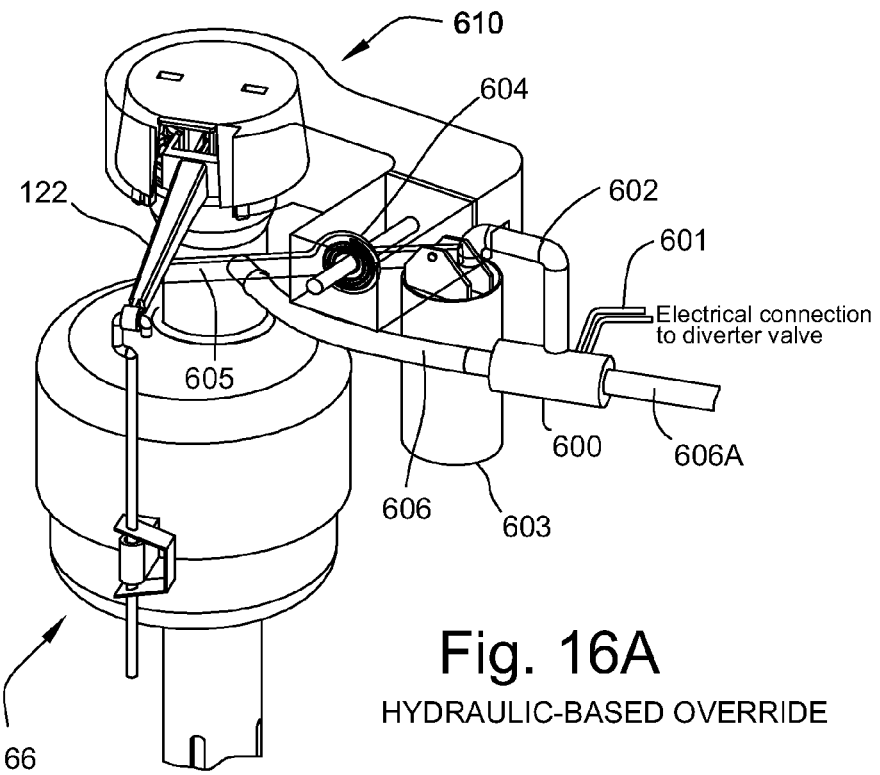
FIGS. 16A and 16B show an exemplary illustrative non-limiting toilet overflow prevention and water conservation device implementation using a hydraulic and gravity lever-based interference mechanism.

FIG. 16A illustrates how the mechanical interference of lever 122, shown in the "down" or "valve open" position, can be accomplished by hydraulic means, such as by using a hydraulic assembly 610. During normal toilet operation where no interference occurs, solenoid diverter valve 600 permits water flow through refill tube 606 into tube 606A, emptying into the toilet tank overflow pipe. When a problem has been detected whereby it becomes necessary to interfere with lever 122 and force fill valve 66 to close, wire 601 is energized causing diverter valve 600 to redirect water flow from refill tube 606 into tube 602. The redirected water through tube 602 then begins to fill container 603. Spring-loaded pivot 604 maintains interfering arm 605 in the disengaged or "down" position until enough water has filled container 603 to raise the arm.

Figure 16B:
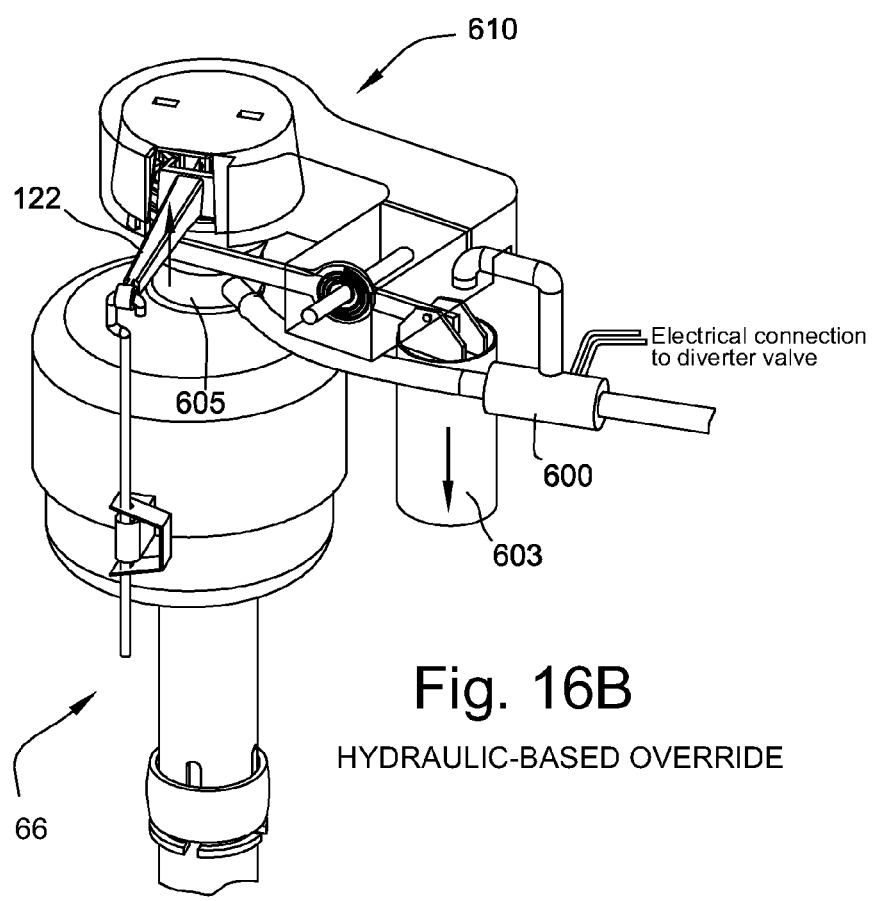

FIG. 16B shows container 603 filled with water, which resulted in raising interfering arm 605, causing lever 122 to also be lifted, thereby turning off water flow through fill valve 66. Once the problem that triggered the interference has been corrected, container 603 can be emptied of its water in any manner of ways (for example, by tilting the container, a small relief valve, etc.), returning fill valve 66 and hydraulic assembly 610 to their normal operating non-interfering states. Hydraulic diverter valve 600 can be reset electrically either manually via pushbutton or automatically.

Figure 16C:
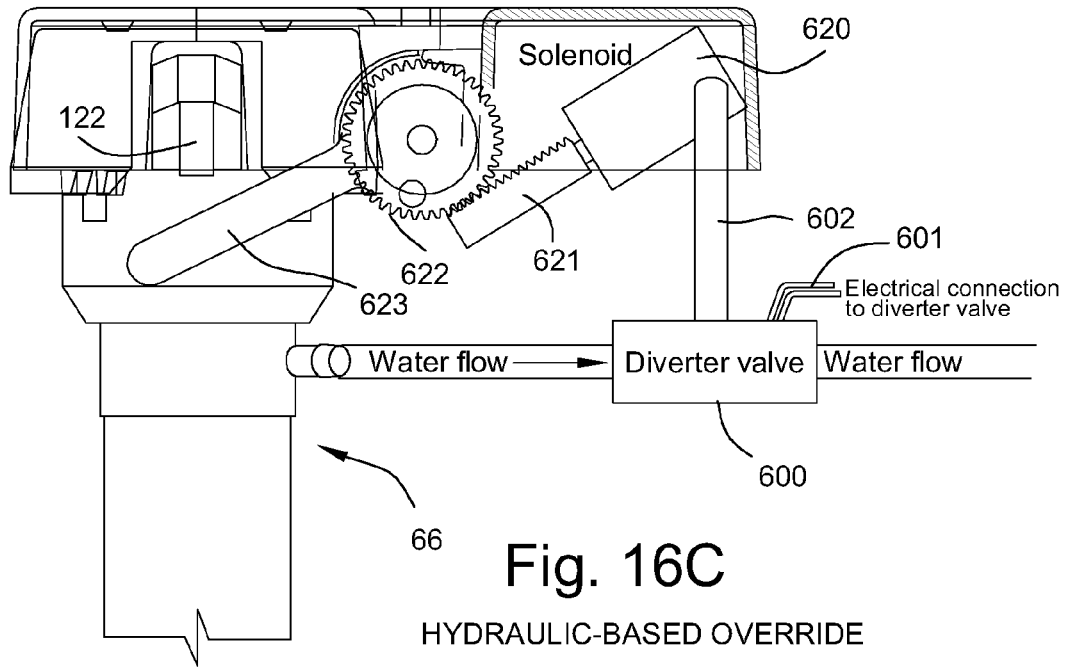
FIGS. 16C and 16D show an exemplary illustrative non-limiting toilet overflow prevention and water conservation device implementation using a hydraulic linear-actuated interference mechanism.
Figure 16D:
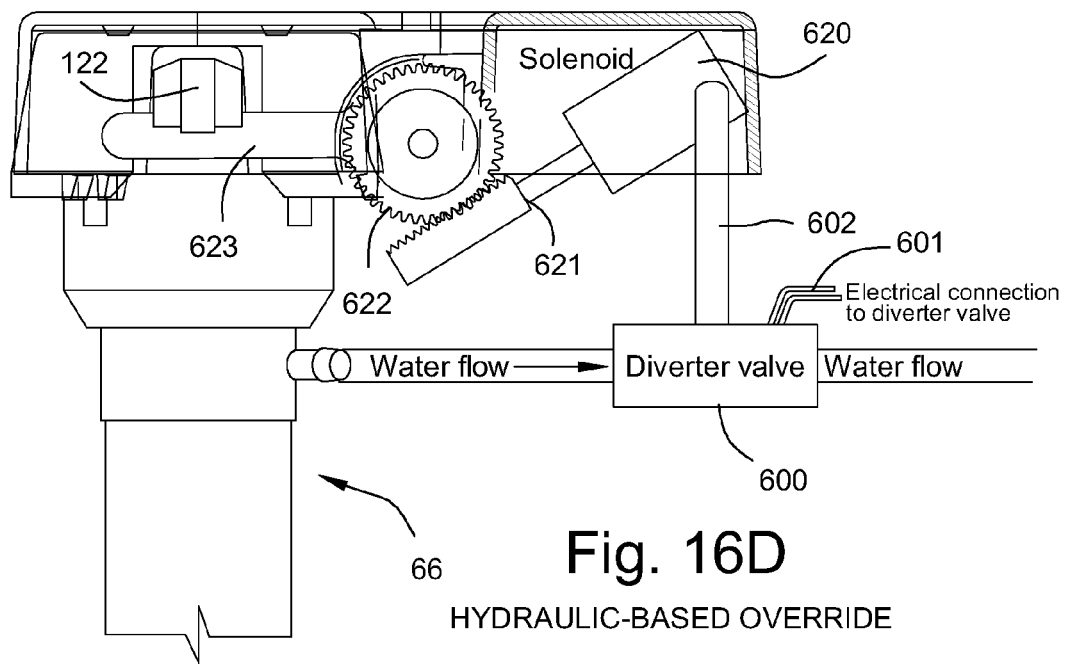

FIGS. 16C and 16D disclose a hydraulic assembly that uses hydraulic linear actuation to interfere with lever 122. In the normal non-interfering state, interfering arm 623 is in the "down" position. When a problem has been detected and wire 601 is energized to activate hydraulic diverter 600, water flows through tube 602 into cylinder 620.

FIG. 16D shows cylinder 620 applying pressure to geared piston 621 and producing a linear traverse movement that engages rotary gear 622. As rotary gear 622 rotates in a clockwise direction, interfering arm 623, which is hard-affixed to rotary gear 622, rises and makes contact with lever 122, raising it and causing fill valve 66 to discontinue water flow. Once the problem that triggered the interference has been corrected, cylinder 620 can be manually or automatically drained of its water (for example, a small relief valve), thus returning rotary gear 622 and interfering arm 623 to their normal disengaged non-interfering states, resulting in lever 122 and fill valve 66 returning also to their normal non-interfered states and modes of operation.

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A device for use with a toilet tank fill valve assembly of the type comprising a float, a water valve that operates in response to the position of said float, said water valve selectively admitting water into a toilet tank, said device comprising:
   a fill valve cap including projections that engage with the fill valve assembly to provide a snap-fit that interlocks the fill valve cap with the fill valve assembly to retain the cap on the fill valve assembly and at least in part cover said water valve;
   an interfering mechanism supported by said fill valve cap, said interfering mechanism acting to conditionally interfere with the operation of said toilet tank fill valve assembly in response to said float position, and
   wherein said device further includes an electrical actuator operatively coupled to the interfering mechanism that actuates said interfering mechanism to conditionally interfere with the operation of said toilet tank fill valve assembly in response to an electrical control signal.

2. A device for use with a toilet tank fill valve assembly of the type comprising a float, a water valve that operates in response to the position of said float, said water valve selectively admitting water into a toilet tank, said device comprising:
   a fill valve cap including projections that engage with the fill valve assembly to provide a snap-fit that retains the fill valve cap on the fill valve assembly to at least in part cover said water valve; and
   an interfering mechanism supported by said fill valve cap, said interfering mechanism acting to conditionally interfere with the operation of said toilet tank fill valve assembly in response to said float position, and
   wherein said interfering mechanism includes a filament.

3. A device for use with a toilet tank fill valve assembly of the type comprising a float, a water valve that operates in response to the position of said float, said water valve selectively admitting water into a toilet tank, said device comprising:
   a replacement fill valve cap including projections that engage with the fill valve assembly to provide a snap-fit that interlocks the replacement fill valve cap onto the fill valve assembly to at least in part cover said water valve; and
   an interfering mechanism supported by said replacement fill valve cap, said interfering mechanism acting to conditionally interfere with the operation of said toilet tank fill valve assembly in response to said float position, and
   wherein said interfering mechanism includes a solenoid.

4. A toilet fill valve assembly for use within a toilet tank, said fill valve assembly comprising:
   a fill valve housing containing a water valve that selectively admits water into said tank;
   a float operatively coupled to said water valve, said float being buoyant within water in said tank, said float position indicating water level within said tank, said float moving to a lower position when water drains from said tank and having a buoyancy that causes the float to move from the lower position to an upper position as water is admitted into said tank;
   a fill valve cap that mates with the fill valve housing and/or the water valve to provide a snap-fit that mechanically engages the fill valve cap with the fill valve housing so that the fill valve housing supports and locates the fill valve cap within the tank; and
   a water conservation mechanism supported by the fill valve cap and operatively coupled to said float, said water conservation mechanism conditionally reducing the quantity of additional water said fill valve admits into said tank, said mechanism being structured to activate conditionally in response to water flow in said tank over time, and
   wherein said water conservation mechanism is structured to selectively interfere with the normal operation of how said water valve responds to said water flow in said tank over time in response to float position indicating water level within said tank by selectively, automatically forcing the float to non-buoyantly move from the lower position to the upper position and to retain the float in the upper position irrespective of water level in the tank to thereby selectively prevent the water valve from admitting water into the tank.

* * * * *